(12) United States Patent
Ebihara et al.

(10) Patent No.: US 12,455,897 B2
(45) Date of Patent: Oct. 28, 2025

(54) INFORMATION PROCESSING APPARATUS, INFORMATION PROCESSING METHOD, AND COMPUTER PROGRAM

(71) Applicant: NEC Corporation, Tokyo (JP)

(72) Inventors: Akinori Ebihara, Tokyo (JP); Taiki Miyagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/269,681

(22) PCT Filed: Dec. 28, 2020

(86) PCT No.: PCT/JP2020/049173
§ 371 (c)(1),
(2) Date: Jun. 26, 2023

(87) PCT Pub. No.: WO2022/144992
PCT Pub. Date: Jul. 7, 2022

(65) Prior Publication Data
US 2024/0061859 A1 Feb. 22, 2024

(51) Int. Cl.
*G06F 16/26* (2019.01)
(52) U.S. Cl.
CPC .................... *G06F 16/26* (2019.01)
(58) Field of Classification Search
CPC ....... G06F 16/26; G06F 16/683; G06F 16/783
See application file for complete search history.

(56) References Cited

U.S. PATENT DOCUMENTS 6,012,039 A * 1/2000 Hoffman ................ G06Q 20/40
705/76
8,212,894 B2 * 7/2012 Nozaki ................ H04N 23/611
348/222.1
(Continued)

FOREIGN PATENT DOCUMENTS

EP    3603506 A1    2/2020
JP    2008-040874 A    2/2008
(Continued)

OTHER PUBLICATIONS

Shakhnarovich et al. "A Unified Learning Framework for Real Time Face Detection and Classification"; Proceedings of the Fifth IEEE International Conference on Automatic Face and Gesture and Gesture Recognition; (US), Institute of Electrical and Electronics Engineers, May 2002, pp. 1-8. (Year: 2002).*
(Continued)

*Primary Examiner* — Cheyne D Ly

(57) ABSTRACT

An information processing apparatus includes: an acquisition unit that obtains a plurality of elements included in series data; a calculation unit that calculates a likelihood ratio indicating a likelihood that the series data are derived from the same target as that of predetermined data, on the basis of at least two consecutive elements of the plurality of elements; and a determination unit that determines whether or not the series data are derived from the same target as that of the predetermined data, on the basis of the likelihood ratio. The calculation unit calculates the likelihood ratio in view of a degree of similarity or difference between the series data and the predetermined data. According to the information processing apparatus, it is possible to accurately determine whether or not the series data is derived from the same target as that of the predetermined data.

10 Claims, 26 Drawing Sheets

(56) References Cited

U.S. PATENT DOCUMENTS

| | | | | |
|---|---|---|---|---|
| 10,044,647 B1* | 8/2018 | Karp | ........................ | H04L 51/02 |
| 2002/0138767 A1* | 9/2002 | Hamid | ................... | G06Q 10/02 |
| | | | | 340/5.82 |
| 2011/0052013 A1 | 3/2011 | Sasahara et al. | | |
| 2013/0243328 A1* | 9/2013 | Irie | ........................ | G06V 40/50 |
| | | | | 382/192 |
| 2015/0362986 A1* | 12/2015 | Lee | ........................ | G06F 1/3293 |
| | | | | 382/118 |
| 2020/0364428 A1* | 11/2020 | Azanza Ladrón | ...... | G06F 21/36 |
| 2020/0379776 A1* | 12/2020 | Lo | ........................ | G06Q 30/0269 |

FOREIGN PATENT DOCUMENTS

| | | |
|---|---|---|
| JP | 2008-299589 A | 12/2008 |
| JP | 2009-245314 A | 10/2009 |
| JP | 2013-120580 A | 6/2013 |
| WO | 2009/091029 A1 | 7/2009 |
| WO | 2018/179301 A1 | 10/2018 |

OTHER PUBLICATIONS

T. Kawamata, T. Ishii and T. Akakura, "Face authentication for e-Learning using time series information," 2016 IEEE International Conference on Teaching, Assessment, and Learning for Engineering (TALE), Bangkok, Thailand, 2016, pp. 116-121. (Year: 2016).*
International Search Report for PCT Application No. PCT/JP2020/049173, mailed on Mar. 2, 2021.

* cited by examiner

INFORMATION PROCESSING APPARATUS, INFORMATION PROCESSING METHOD, AND COMPUTER PROGRAM

This application is a National Stage Entry of PCT/JP2020/049173 filed on Dec. 28, 2020, the contents of all of which are incorporated herein by reference, in their entirety.

TECHNICAL FIELD

This disclosure relates to an information processing apparatus, an information processing method, and a computer program that process information about class classification, for example.

BACKGROUND ART

A known apparatus of this type performs a collation process for a living body. For example, Patent Literature 1 discloses that a likelihood ratio is calculated on the basis of a degree of similarity between an obtained biometric information and a plurality of registered biometric informations, by which identity verification is performed. Patent Literature 2 discloses that a log likelihood ratio between a genuine distribution for a person in question and an imposter distribution for another person is obtained by using a matching score corresponding to the biometric information. Patent Literature 3 discloses that a distribution of scores is obtained by collating an inputted face image with face images of all registrants, and that a registrant who obtains the highest score is estimated to be a person in question.

As another related technique/technology, for example, Patent Literature 4 discloses that an integrated likelihood ratio is calculated from a first likelihood ratio and a second likelihood ratio, and that an integrated likelihood indicating the likelihood of face attitude candidates that constitute a face attitude candidate group is calculated.

CITATION LIST

Patent Literature

Patent Literature 1: JP2013-120580A
Patent Literature 2: JP2008-299589A
Patent Literature 3: JP2008-040874A
Patent Literature 4: International Publication WO2009/091029A1

SUMMARY

Technical Problem

This disclosure aims to improve the related techniques/technologies described above.

Solution to Problem

An information processing apparatus according to an example aspect of this disclosure includes: an acquisition unit that obtains a plurality of elements included in series data; a calculation unit that calculates a likelihood ratio indicating a likelihood that the series data are derived from the same target as that of predetermined data, on the basis of at least two consecutive elements of the plurality of elements; and a determination unit that determines whether or not the series data are derived from the same target as that of the predetermined data, on the basis of the likelihood ratio, wherein the calculation unit calculates the likelihood ratio in view of a degree of similarity or difference between the series data and the predetermined data.

An information processing method according to an example aspect of this disclosure includes: obtaining a plurality of elements included in series data; calculating a likelihood ratio indicating a likelihood that the series data are derived from the same target as that of predetermined data, on the basis of at least two consecutive elements of the plurality of elements; determining whether or not the series data are derived from the same target as that of the predetermined data, on the basis of the likelihood ratio; and when calculating the likelihood ratio, taking into account a degree of similarity or difference between the series data and the predetermined data.

A computer program according to an example aspect of this disclosure operates a computer: to obtain a plurality of elements included in series data; to calculate a likelihood ratio indicating a likelihood that the series data are derived from the same target as that of predetermined data, on the basis of at least two consecutive elements of the plurality of elements; to determine whether or not the series data are derived from the same target as that of the predetermined data, on the basis of the likelihood ratio; and when calculating the likelihood ratio, to take into account a degree of similarity or difference between the series data and the predetermined data.

DESCRIPTION OF EXAMPLE EMBODIMENTS

Hereinafter, an information processing apparatus, an information processing method, and a computer program according to example embodiments will be described with reference to the drawings.

First Example Embodiment

An information processing apparatus according to a first example embodiment will be described with reference to FIG. 1 to FIG. 4.
(Hardware Configuration)

Figure 1:
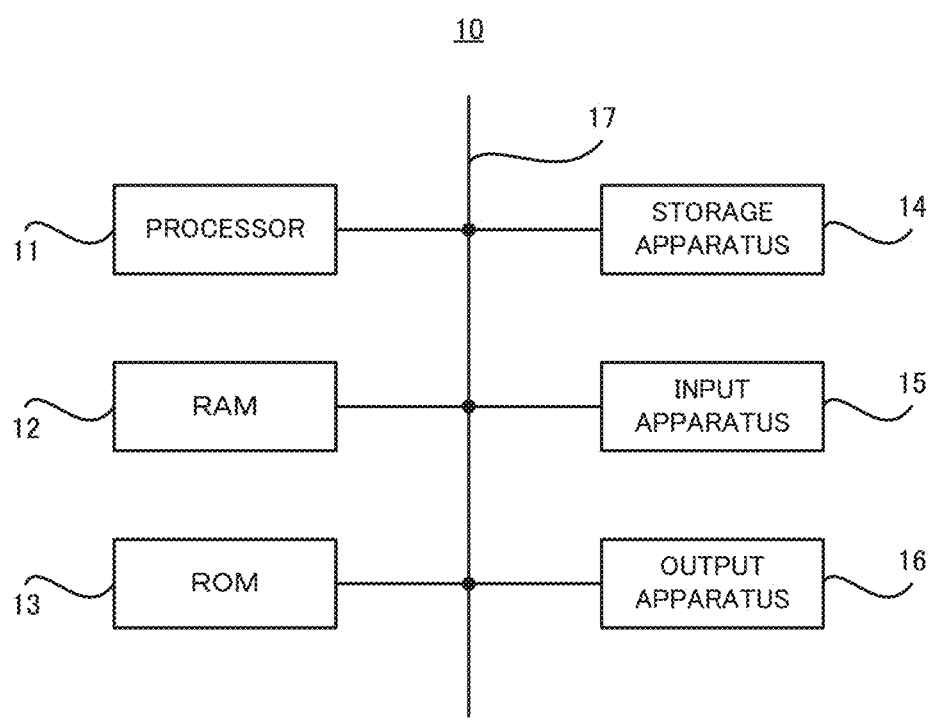
FIG. 1 is a block diagram illustrating a hardware configuration of an information processing apparatus according to a first example embodiment.

First, with reference to FIG. 1, a hardware configuration of the information processing apparatus according to the first example embodiment will be described. FIG. 1 is a block diagram illustrating a hardware configuration of the information processing apparatus according to the first example embodiment.

As illustrated in FIG. 1, an information processing apparatus 10 according to the first example embodiment includes a processor 11, a RAM (Random Access Memory) 12, a ROM (Read Only Memory) 13, and a storage apparatus 14. The information processing apparatus 10 may further include an input apparatus 15 and an output apparatus 16. The processor 11, the RAM 12, the ROM 13, the storage apparatus 14, the input apparatus 15, and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium by using a not-illustrated recording medium reading apparatus. The processor 11 may obtain (i.e., may read) a computer program from a not-illustrated apparatus disposed outside the information processing apparatus 10, through a network interface. The processor 11 controls the RAM 12, the storage apparatus 14, the input apparatus 15, and the output apparatus 16 by executing the read computer program. Especially in this example embodiment, when the processor 11 executes the read computer program, a functional block for performing a determination process using a likelihood ratio is realized in the processor 11. An example of the processor 11 includes a CPU (Central Processing Unit), a GPU (Graphics Processing Unit), a FPGA (field-programmable gate array), a DSP (Demand-Side Platform), and an ASIC (Application Specific Integrated Circuit). The processor 11 may be one of the examples described above, or may use a plurality of them in parallel.

The RAM 12 temporarily stores the computer program to be executed by the processor 11. The RAM 12 temporarily stores the data that is temporarily used by the processor 11 when the processor 11 executes the computer program. The RAM 12 may be, for example, a D-RAM (Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that is stored for a long term by the information processing apparatus 10. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the information processing apparatus 10. The input apparatus 15 may include, for example, at least one of a keyboard, a mouse, and a touch panel. The input apparatus 15 may be a dedicated controller (operation terminal). The input apparatus 15 may also include a terminal owned by the user (e.g., a smartphone or a tablet terminal, etc.). The input apparatus 15 may be an apparatus that allows an audio input including a microphone, for example.

The output apparatus 16 is an apparatus that outputs information about the information processing apparatus 10 to the outside. For example, the output apparatus 16 may be a display apparatus (e.g., a display) that is configured to display the information about the information-processing apparatus 10. The display apparatus here may be a TV monitor, a personal computer monitor, a smartphone monitor, a tablet terminal monitor, or another portable terminal monitor. The display apparatus may be a large monitor or a digital signage installed in various facilities such as stores. The output apparatus 16 may be an apparatus that outputs the information in a format other than an image. For example, the output apparatus 16 may be a speaker that audio-outputs the information about the information processing apparatus 10.

(Functional Configuration)

Figure 2:
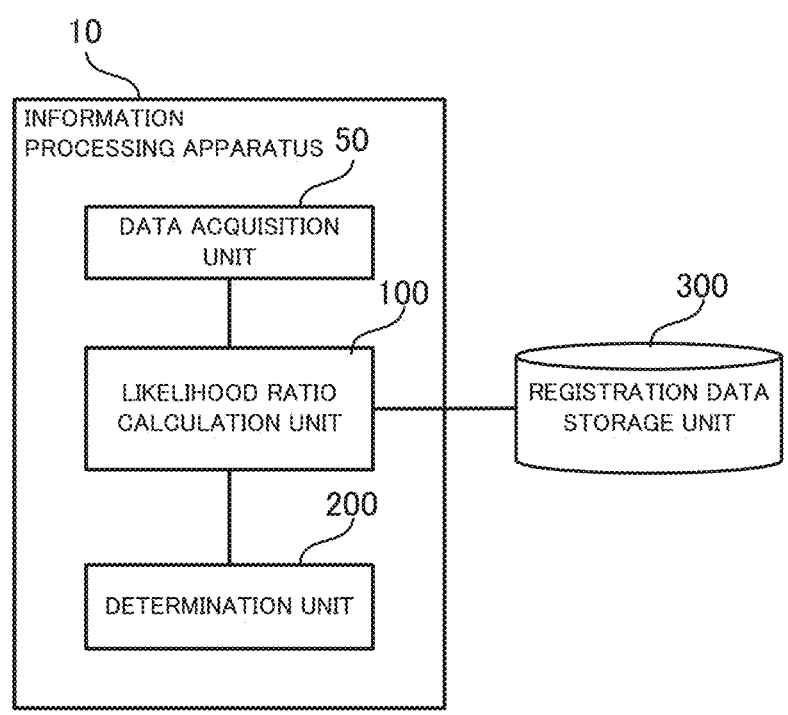
FIG. 2 is a block diagram illustrating a functional configuration of the information processing apparatus according to the first example embodiment.

Next, a functional configuration of the information processing apparatus 10 according to the first example embodiment will be described with reference to FIG. 2. FIG. 2 is a block diagram illustrating the functional configuration of the information processing apparatus according to the first example embodiment.

As illustrated in FIG. 2, the information processing apparatus 10 according to the first example embodiment includes, as processing blocks for realizing the functions thereof, a data acquisition unit 50, a likelihood ratio calculation unit 100, and a determination unit 200. Each of the data acquisition unit 50, the likelihood ratio calculation unit 100, and the determination unit 200 may be realized or implemented by the processor 11 (see FIG. 1), for example.

The data acquisition unit 50 is configured to obtain a plurality of elements included in series data. The data acquisition unit 50 may directly obtain data from an arbitrary data acquisition apparatus (e.g., a camera or a microphone) or may read data obtained in advance by a data acquisition apparatus and stored in a storage or the like. When data are obtained from a camera, the data acquisition unit 50 may be configured to obtain the data from each of a plurality of cameras. The elements of the series data obtained by the data acquisition unit 50 is configured to be outputted to the likelihood ratio calculation unit 100. The series data are data including a plurality of elements arranged in a predetermined order, and an example thereof is time series data, for example. A more specific example of the series data includes, but is not limited to, video data and audio data.

The likelihood ratio calculation unit 100 is configured to calculate a likelihood ratio on the basis of at least two consecutive elements of the plurality of elements obtained by the data acquisition unit 50. The "likelihood ratio" here is an index indicating a likelihood that the series data are derived from the same target as that of predetermined registration data. The likelihood ratio may be calculated as a log likelihood ratio (LLR), for example. The likelihood ratio may be calculated as an integrated likelihood ratio obtained by integrating individual likelihood ratios calculated from two consecutive elements.

The likelihood ratio calculation unit 100 is configured to read information about the registration data, as appropriate, from a registration data storage unit 300 that stores registration data. Especially, the likelihood ratio calculation unit 100 according to this example embodiment is configured to calculate the likelihood ratio, in view of a degree of similarity or difference between the series data and the registration data. A specific method of calculating the likelihood ratio will be described in detail in another example embodiment described later.

The determination unit 200 determines whether or not the series data are derived from the same target as that of the registration data, on the basis of the likelihood ratio calculated by the likelihood ratio calculation unit 100. When the calculated likelihood ratio reaches a predetermined threshold, the determination unit 200 may determine that the series data and the registration data are derived from the same target. In addition, when the calculated likelihood ratio reaches another predetermined threshold, the determination unit 200 may determine that the series data and the registration data are not derived from the same target.

(Flow of Operation)

Figure 3:
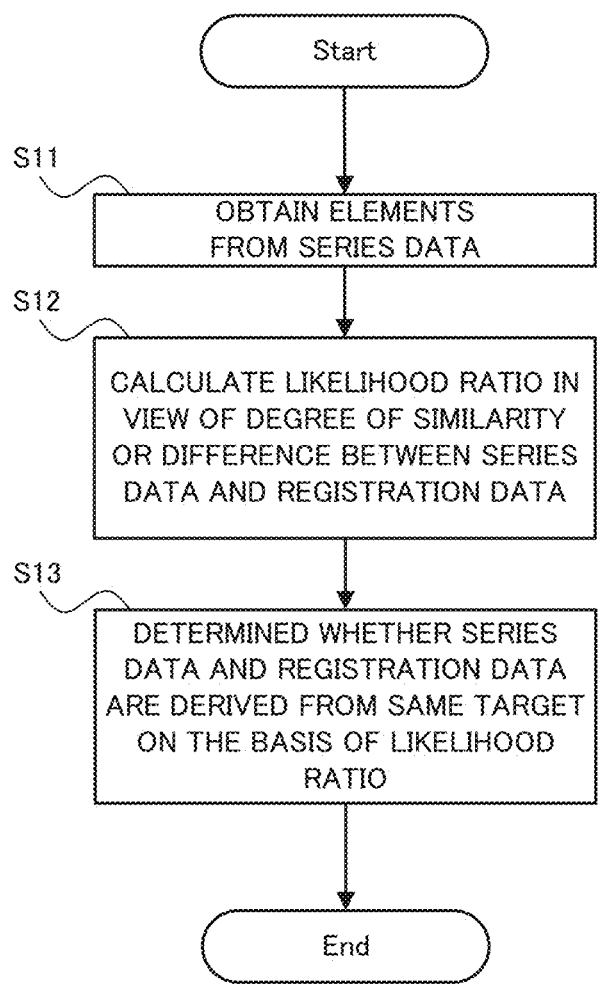
FIG. 3 is a flowchart illustrating a flow of operation of the information processing apparatus according to the first example embodiment.

Next, a flow of operation of the information processing apparatus 10 according to the first example embodiment will be described with reference to FIG. 3. FIG. 3 is a flowchart illustrating the flow of the operation of the information processing apparatus according to the first example embodiment.

As illustrated in FIG. 3, when the operation of the information processing apparatus 10 according to the first example embodiment is started, first, the data acquisition unit 50 obtains elements included in the series data (step S11). The data acquisition unit 50 outputs the obtained elements of the series data to the likelihood ratio calculation unit 100.

Subsequently, the likelihood ratio calculation unit 100 calculates the likelihood ratio on the basis of the obtained two or more elements. At this time, the likelihood ratio calculation unit 100 calculates the likelihood ratio in view of the degree of similarity or difference between the series data and the registration data (step S12). That is, the likelihood ratio is calculated as a value that takes into account not only the obtained series data, but also the registration data.

Subsequently, the determination unit 200 determines whether or not the series data and the registration data are derived from the same target, on the basis of the calculated likelihood ratio (step S13). The determination unit 200 may output a determination result to a display or the like. The determination unit 200 may audio-output the determination result through a speaker or the like.

When the determination unit 200 is not capable of determining whether or not the series data and the registration data are from the same target (e.g., when the likelihood ratio does not reach a threshold used for the determination or in similar cases), a series of processing steps described above may be repeatedly performed. Specifically, a process of obtaining new elements from the series data and calculating the likelihood ratio in view of the newly obtained elements may be repeated.

Specific Example of Determination

Figure 4:
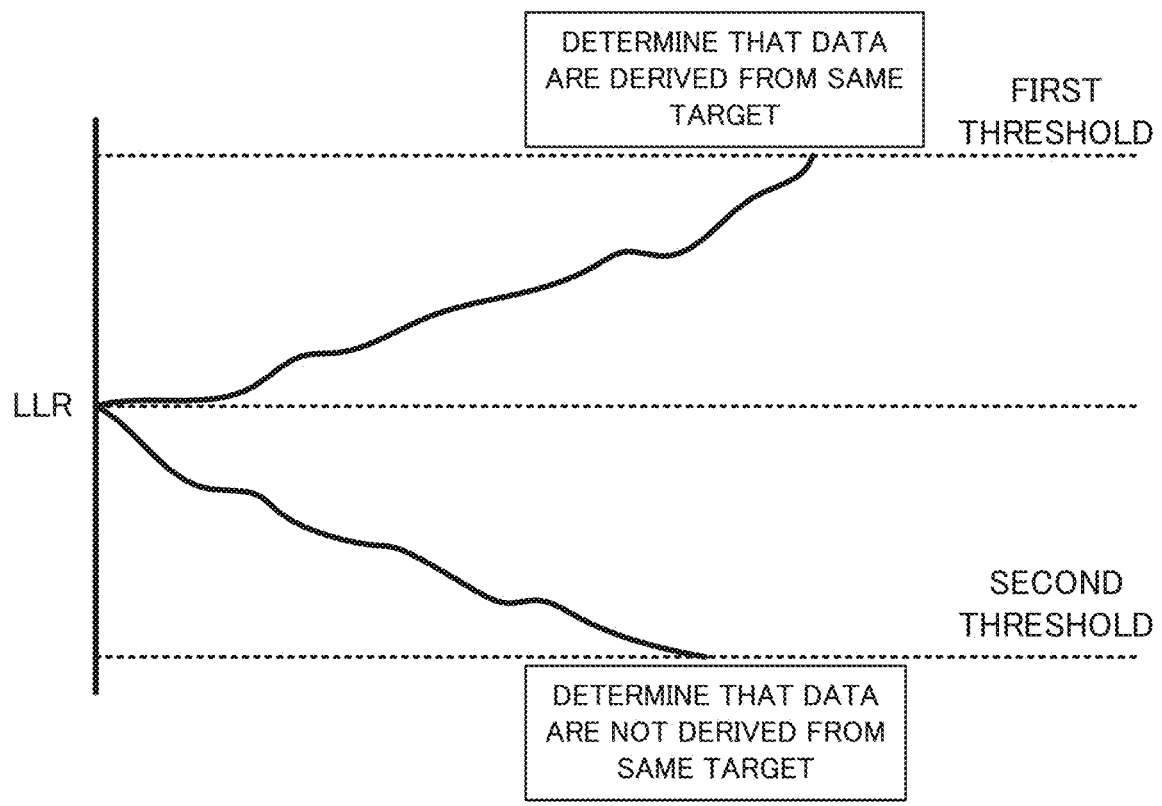
FIG. 4 is a graph illustrating an example of a likelihood ratio calculated by the information processing apparatus according to the first example embodiment.

Next, with reference to FIG. 4, a specific example of determination by the information processing apparatus 10 according to the first example embodiment will be described. FIG. 4 is a graph illustrating an example of the likelihood ratio calculated by the information processing apparatus according to the first example embodiment. In the example of FIG. 4, it is assumed that the likelihood ratio is calculated as the log likelihood ratio (LLR).

The likelihood ratio illustrated in FIG. 4 can be expressed as in the following equation (1), for example. Note that y=1 is a class in which the series data and the registration data are derived from the same target, and y=0 is a class in which the series data and registration data are not derived from the same target.

$$LLR = p(X|y=1)/p(X|y=0) \quad (1)$$

This likelihood ratio is gradually changed from an initial value by repeating a series of processing steps described above (see FIG. 3). The determination unit 200 performs the determination by using a first threshold corresponding to a state in which the series data and the registration data are derived from the same target, and a second threshold corresponding to a state in which the series data and the registration data are not derived from the same target, for example. Specifically, when the likelihood ratio reaches the first threshold, the determination unit 200 determines that the series data and the registration data are derived from the same target. On the other hand, when the likelihood ratio reaches the second threshold, the determination unit 200 determines that the series data and the registration data are not derived from the same target.

(Technical Effect)

Next, a technical effect obtained by the information processing apparatus 10 according to the first example embodiment will be described.

As described in FIG. 1 to FIG. 4, in the information processing apparatus 10 according to the first example embodiment, when the likelihood ratio is calculated, the degree of similarity or difference between the series data and the registration data is considered. In this way, it is possible to determine whether the series data and the registration data are derived from the same target, by using the likelihood ratio calculated from the series data. More specifically, it is possible to determine to which class the inputted series data belong, the class in which the series data and the registration data are derived from the same target, or the class in which the series data and the registration data are not derived from the same target.

Second Example Embodiment

The information processing apparatus 10 according to a second example embodiment will be described with reference to FIG. 5 to FIG. 7. The second example embodiment describes a specific example of the series data and the registration data handled in the first example embodiment, and may be the same as the first example embodiment in the apparatus configuration (see FIG. 1 and FIG. 2), for example. For this reason, a part that is different from the first example embodiment will be described in detail below, and a description of other overlapping parts will be omitted as appropriate.

Specific Examples of Data

First, with reference to FIG. 5 and FIG. 6, the series data and the registration data handled by the information processing apparatus 10 according to the second example embodiment will be described. FIG. 5 is a diagram illustrating an example of image data handled by the information processing apparatus according to the second example embodiment. FIG. 6 is a diagram illustrating an example of audio data handled by the information processing apparatus according to the second example embodiment.

Figure 5:
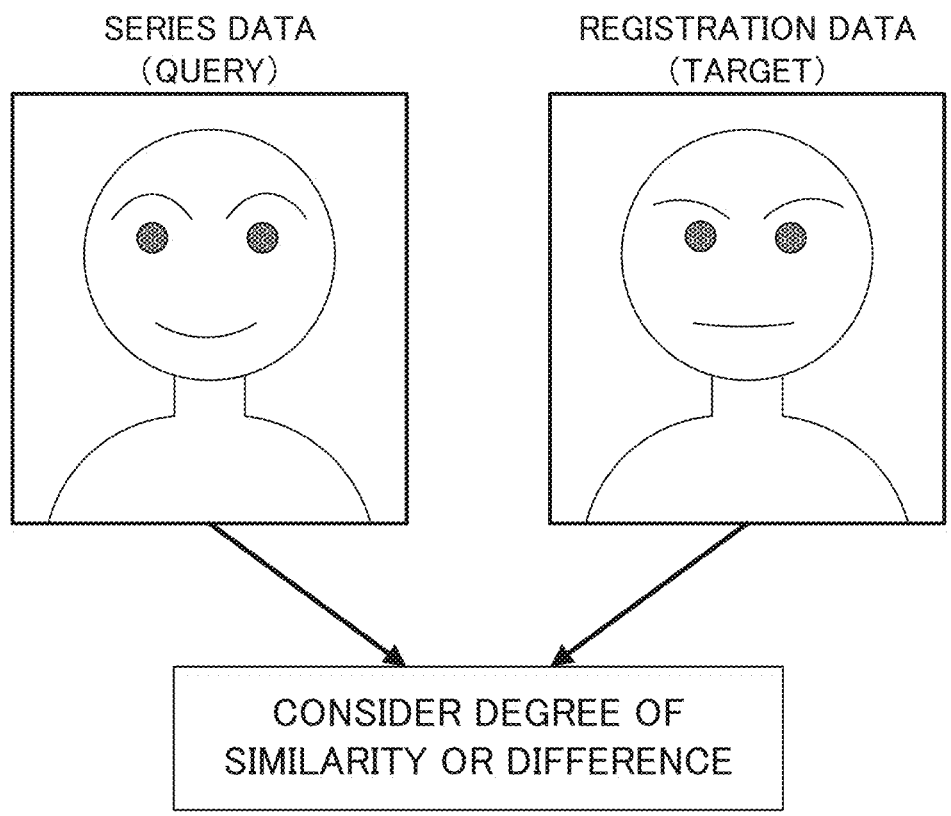
FIG. 5 is a diagram illustrating an example of image data handled by an information processing apparatus according to a second example embodiment.

As illustrated in FIG. 5, the series data (hereinafter sometimes referred to as a "query" as appropriate) and the registration data (hereinafter sometimes referred to as a "target" as appropriate) handled by the information processing apparatus 10 according to the second example embodiment may be image data, respectively. More specifically, the series data and the registration data may be image data including a person (e.g., face image data obtained by imaging a person's face). Alternatively, the series data and the registration data may be image data including an object such as a snake, an animal like a dog, and a robot, in addition to or in place of the person. The series data may be inputted as a plurality of time-series image data (i.e., video data), for example. The registration data may be registered as data about at least a single image. The registration data may be video data, or may be a 3D image. By using image data including a person, it is possible to determine whether or not the series data and the registration data are derived from the same person, on the basis of the calculated likelihood ratio.

As illustrated in FIG. 5, the series data and the registration data handled by the information processing apparatus 10 according to the second example embodiment may be audio data, respectively. More specifically, the series data and the registration data may be data including a voice or a sound from a person. Alternatively, the series data and the registration data may be audio data about a sound from an object such as a snake, an animal like a dog, and a robot. The series data may be inputted as time-series audio data about a voice or a sound from a person, an animal, or the like, for example. The registration data may be registered as voiceprint data of a fixed length, for example. By using the audio data from the person or the like, it is possible to determine whether or not the series data and the registration data are derived from the same person (i.e., from the same target) on the basis of the calculated likelihood ratio.

(Flow of Operation)

Next, with reference to FIG. 7, a flow of operation of the information processing apparatus 10 according to the second example embodiment will be described. FIG. 7 is a flowchart illustrating the flow of the operation of the information processing apparatus according to the second example embodiment.

Figure 7:
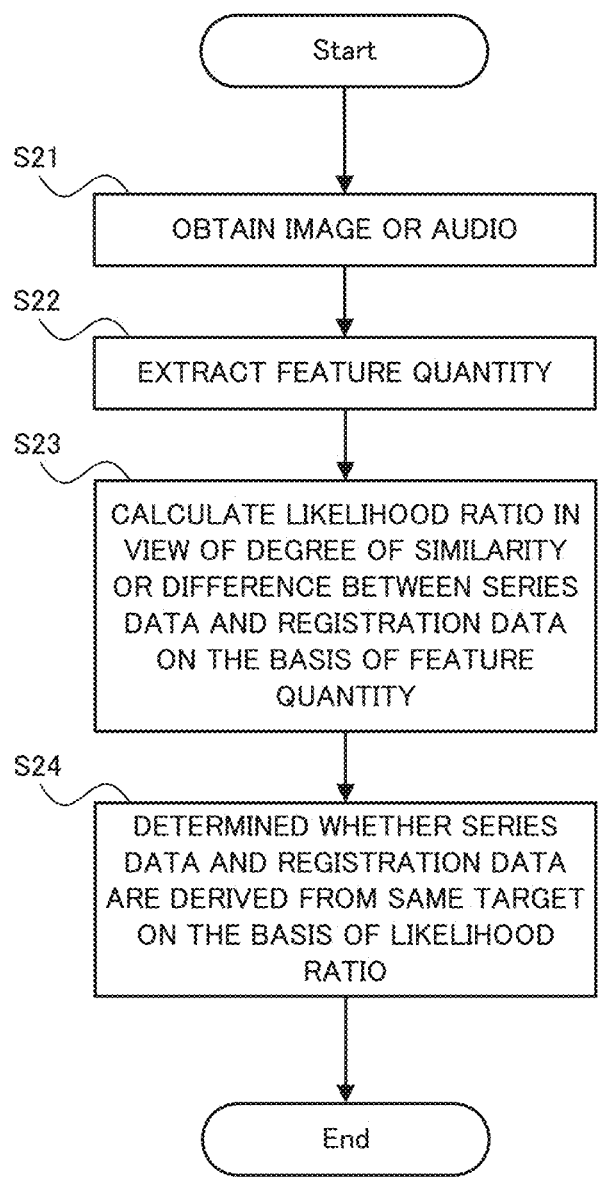
FIG. 7 is a flowchart illustrating a flow of operation of the information processing apparatus according to the second example embodiment.

As illustrated in FIG. 7, when the operation of the information processing apparatus 10 according to the second example embodiment is started, first, the data acquisition unit 50 obtains image data or audio data included in the series data (step S21). The data acquisition unit 50 outputs the obtained image data or audio data to the likelihood ratio calculation unit 100.

Subsequently, the likelihood ratio calculation unit 100 extracts a feature quantity from the obtained image data or audio data (step S22). A detailed description of a specific method of extracting the feature quantity will be omitted here, because existing techniques/technologies can be adopted to the method as appropriate. Then, the likelihood ratio calculation unit 100 calculates the likelihood ratio on the basis of the extracted feature quantity. At this time, the likelihood ratio calculation unit 100 calculates the likelihood ratio in view of the degree of similarity or difference between the series data and the registration data (step S23).

Subsequently, the determination unit 200 determines whether or not the series data and the registration data are derived from the same person on the basis of the calculated likelihood ratio (step S24). The determination unit 200 may output a determination result to a display, a speaker, or the like. The determination unit 200 may perform a predetermined process in accordance with the determination result (e.g., a process performed on condition of personal authentication, etc.).

(Technical Effect)

Next, a technical effect obtained by the information processing apparatus 10 according to the second example embodiment will be described.

Figure 6:
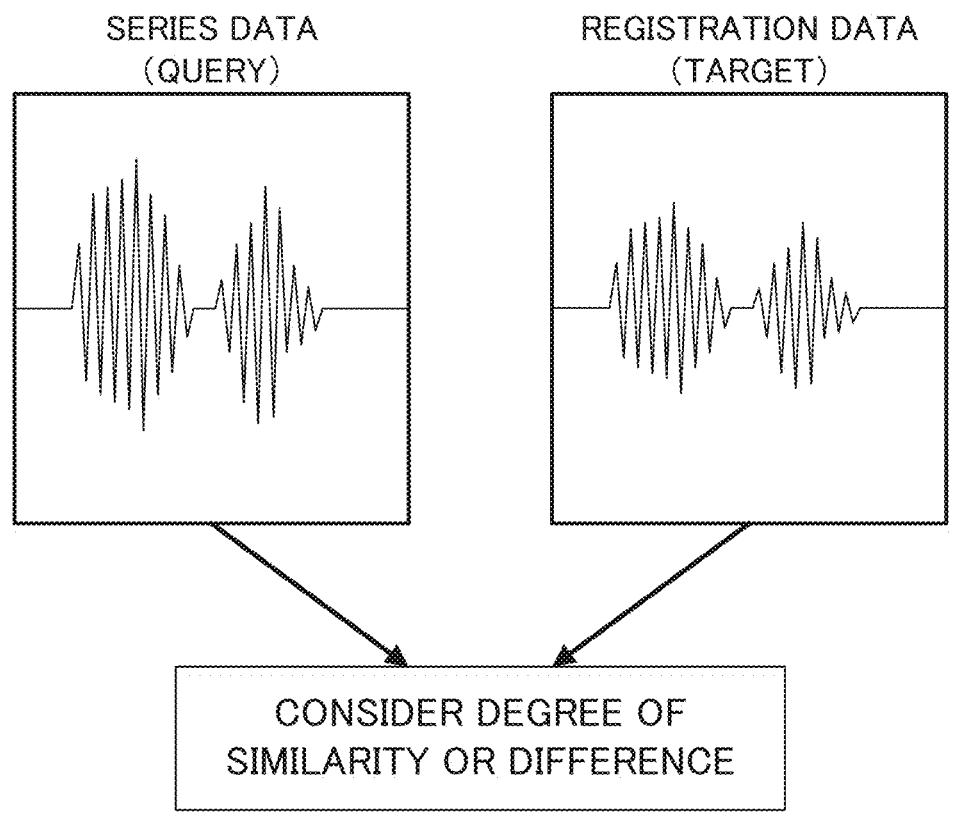
FIG. 6 is a diagram illustrating an example of audio data handled by the information processing apparatus according to the second example embodiment.

As illustrated in FIG. 5 to FIG. 7, in the information processing apparatus 10 according to the second example embodiment, the series data and the registration data include image data or audio data. When the image data are used, it is possible to determine whether a person included in an image is the same as a registered person. Therefore, the information processing apparatus 10 according to the second example embodiment can be applied to an apparatus that performs face authentication, for example. In addition, when the audio data are used, it is possible to determine whether a person who utters a voice or a sound is the same as a registered person. Therefore, the information processing apparatus 10 according to the second example embodiment can be applied to an apparatus that performs voice authentication, for example.

Third Example Embodiment

The information processing apparatus 10 according to a third example embodiment will be described with reference to FIG. 8 to FIG. 10. The third example embodiment is partially different from the first and second example embodiments only in the configuration and operation, and may be the same as those of the first and second example embodiments in the other parts. For this reason, a part that is different from each of the example embodiments described above will be described in detail below, and a description of other overlapping parts will be omitted as appropriate.
(Functional Configuration)

First, with reference to FIG. 8, a functional configuration of the information processing apparatus 10 according to the third example embodiment will be described. FIG. 8 is a block diagram illustrating the functional configuration of the information processing apparatus according to the third example embodiment. In FIG. 8, the same components as those illustrated in FIG. 2 carry the same reference numerals.

Figure 8:
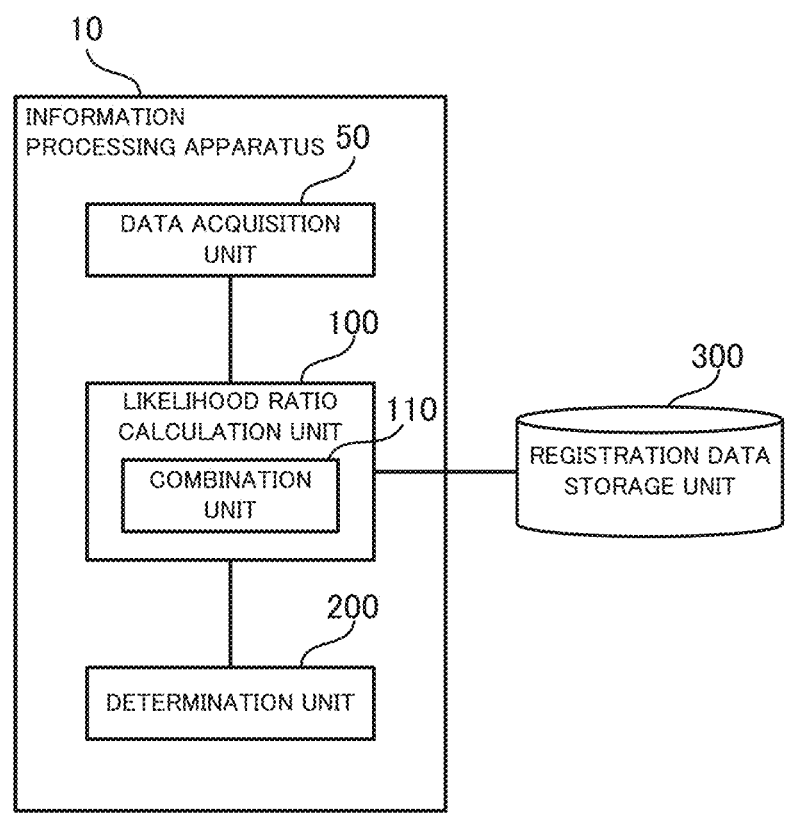
FIG. 8 is a block diagram illustrating a functional configuration of an information processing apparatus according to a third example embodiment.

As illustrated in FIG. 8, the information processing apparatus 10 according to the third example embodiment includes, as processing blocks for realizing the functions thereof, the data acquisition unit 50, the likelihood ratio calculation unit 100, and the determination unit 200. Then, the likelihood ratio calculation unit 100 according to the third example embodiment especially includes a combination unit 110. The combination unit 110 may be realized or implemented by the processor 1 (see FIG. 1), for example.

The combination unit 110 is configured to combine a feature vector extracted from the series data (hereinafter referred to as a "query vector" as appropriate) and a feature vector extracted from the registration data (hereinafter referred to as a "target vector" as appropriate). The combination unit 110 combines the query vector and the target vector to generate a combined vector. A length of the combined vector is the sum of a length of the query vector and a length of the target vector. The combined vector generated by the combination unit 110 is used to calculate the likelihood ratio.
(Flow of Operation)

Next, with reference to FIG. 9, a flow of operation of the information processing apparatus 10 according to the third example embodiment will be described. FIG. 9 is a flowchart illustrating the flow of the operation of the information processing apparatus according to the third example embodiment. In FIG. 9, the same steps as those illustrated in FIG. 3 carry the same reference numerals.

Figure 9:
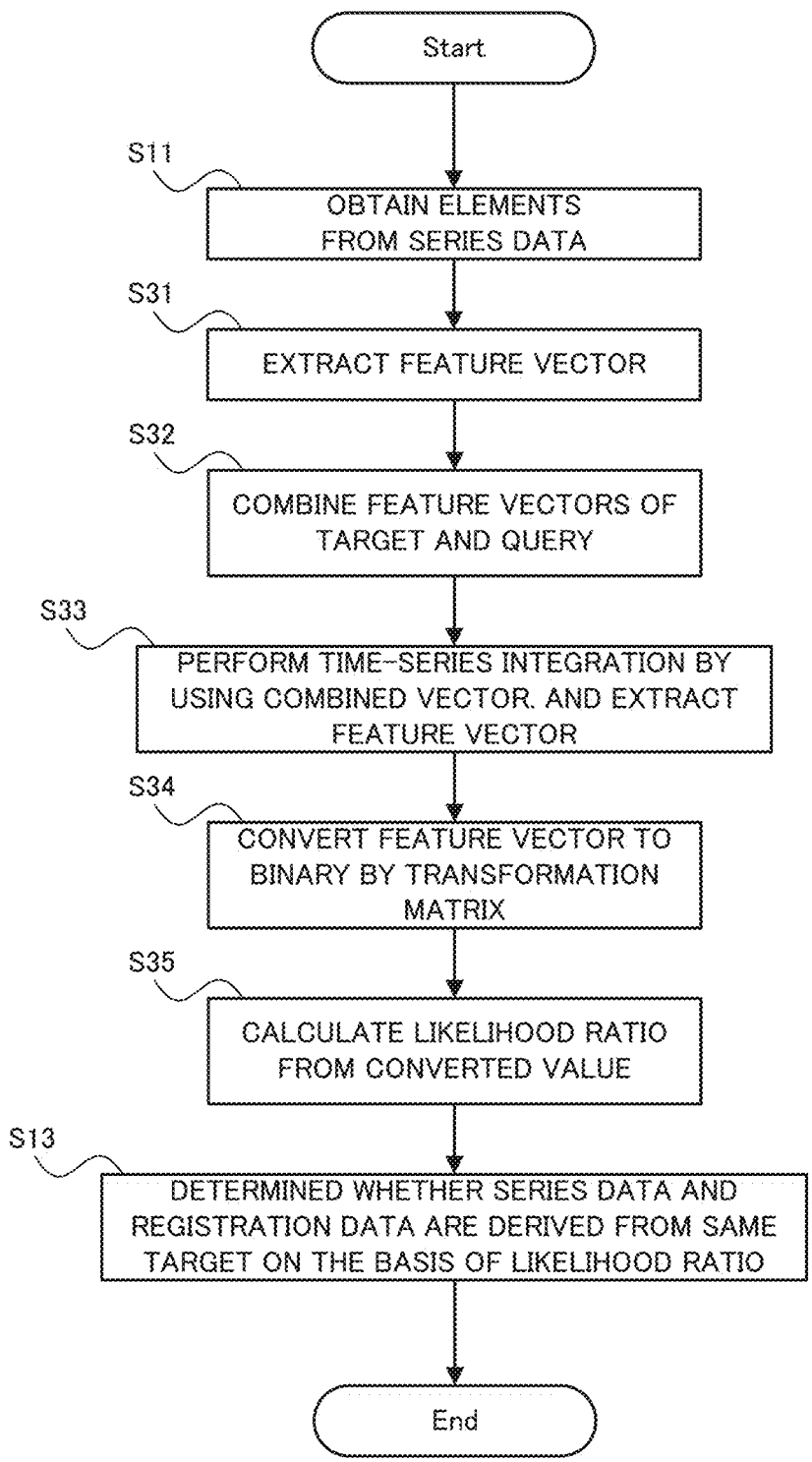
FIG. 9 is a flowchart illustrating a flow of operation of the information processing apparatus according to the third example embodiment.

As illustrated in FIG. 9, when the operation of the information processing apparatus 10 according to the third example embodiment is started, first, the data acquisition unit 50 obtains elements included in the series data (step S11). The data acquisition unit 50 outputs the obtained elements of the series data to the likelihood ratio calculation unit 100.

Subsequently, the likelihood ratio calculation unit 100 extracts the feature vector (i.e., the query vector) from the obtained elements of the series data (step S31). When the query vector is extracted, the combination unit 110 combines the query vector and the target vector to generate the combined vector (step S32). The target vector may be extracted in advance when the registration data are registered or in similar cases. In this case, the target vector may be stored in the registration data storage unit 300 together with the registration data, and the combination unit 110 reads the target vector from the registration data storage unit 300 and combines it with the query vector. Alternatively, the target vector may be newly extracted from the registration data when the combined vector is generated. In this case, the combination unit 110 performs a process of reading the registration data from the registration data storage unit 300 and of extracting the target vector from the registration data. Then, the combination unit 110 combines the extracted target vector with the query vector.

Subsequently, the likelihood ratio calculation unit 100 performs time series integration by using the combined vector and extracts the feature vector (step S33). The likelihood ratio calculation unit 100 inputs the combined vector to a LSTM (Long Short Term Memory), and obtains the feature vector as an output thereof, for example. The LSTM here is an example, and the same process may be performed by using an arbitrary recursive neural network. For example, a RNN (Recurrent Neural Network) may be used to extract the feature vector.

Subsequently, the likelihood ratio calculation unit 100 converts the feature vector to a binary by a transformation matrix (step S34). Specifically, the likelihood ratio calculation unit 100 converts the feature vector to a binary indicating that the series data and the registration data are derived from the same target and that the series data and the registration data are not derived from the same target. The likelihood ratio calculation unit 100 converts (i.e., scales) each value range of the binary to [0, 1].

Subsequently, the likelihood ratio calculation unit 100 calculates the likelihood ratio from the converted value (step S35). The likelihood ratio calculated in this manner is a value that takes into account the degree of similarity or difference between the series data and the registration data. Specifically, the query vector extracted from the series data and the target vector extracted from the registration data are combined, and the likelihood ratio is calculated on the basis of the combined vector. Consequently, the calculated likelihood ratio takes into account the degree of similarity or difference between the series data and the registration data.

Lastly, the determination unit 200 determines whether the series data and the registration data are derived from the same target on the basis of the calculated likelihood ratio (step S13).

Specific Example of Operation

Next, a specific example of the operation of the information processing apparatus 10 according to the third example embodiment will be described with reference to FIG. 10. FIG. 10 is a conceptual diagram illustrating the specific example of the operation of the information processing apparatus according to the third example embodiment. In the operation example illustrated in FIG. 10, as described in the second example embodiment (see FIG. 5 to FIG. 7), it is determined whether or not the series data and the registration data are derived from the same person.

Figure 10:
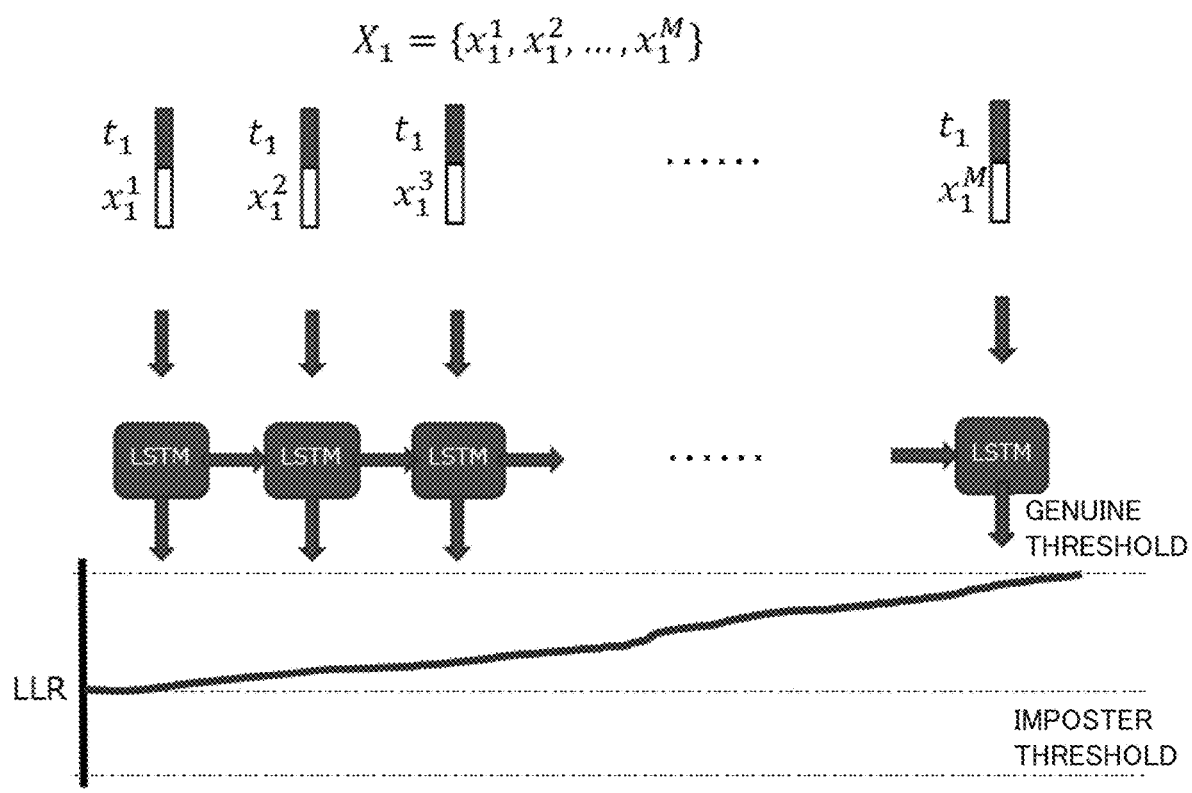
FIG. 10 is a conceptual diagram illustrating a specific example of the operation of the information processing apparatus according to the third example embodiment.

In FIG. 10, the query vector is expressed as $X_1 = \{x_1^1, x_1^2, \ldots, x_1^M\}$ and the target vector is expressed as $t_1$. In this case, the combination unit 110 sequentially combines the query vector corresponding to each element and the target vector.

Specifically, first, the combination unit 110 combines the query vector $x_1^1$ and the target vector $t_1$ to generate a combined vector $t_1 x_1^1$. Then, the combined vector $t_1 x_1^1$ is inputted to the LSTM to extract the feature vector, and the likelihood ratio is calculated from the value obtained by converting the feature vector. Subsequently, the combination unit 110 combines the query vector $x1^2$ and the target vector $t_1$ to generate a combined vector $t_1x_1^2$. Then, the combined vector $t_1x_1^2$ is inputted to the LSTM to extract the feature vector, and the likelihood ratio is calculated from the value obtained by converting the feature vector. Such a process is repeated in the same manner, and the combination unit 110 lastly combines the query vector $x_1^M$ and the target vector $t_1$ to generate a combined vector $t_1x_1^M$. Then, the combined vector $t_1x_1^M$ is inputted to the LSTM to extract the feature vector, and the likelihood ratio is calculated from the value obtained by converting the feature vector.

In the example illustrated in FIG. 10, the determination is performed by comparing the likelihood ratio calculated by the above process with a genuine threshold (i.e., a threshold corresponding to a state in which the series data and the registration data are derived from the same person) and an imposter threshold (i.e., a threshold corresponding to a state in which the series data and the registration data are not derived from the same person). In the example illustrated in FIG. 10, the likelihood ratio gradually changes toward the genuine threshold, and in the end, it reaches the genuine threshold. Therefore, the determination unit 200 determines that the series data and the registration data are derived from the same person.

(Technical Effect)

Next, a technical effect obtained by the information processing apparatus 10 according to the third example embodiment will be described.

As described in FIG. 8 to FIG. 10, in the information processing apparatus 10 according to the third example embodiment, the following process is performed: combining the query vector and the target vector to generate the combined vector, and calculating the likelihood ratio by using the combined vector. The likelihood ratio calculated is a value that takes into account the degree of similarity or difference between the series data and the registration data. Therefore, according to the information processing apparatus 10 in the third example embodiment, it is possible to determine whether or not the series data and the registration data are derived from the same target on the basis of the calculated likelihood ratio.

Fourth Example Embodiment

The information processing apparatus 10 according to a fourth example embodiment will be described with reference to FIG. 11 to FIG. 13. The fourth example embodiment is partially different from the first to third example embodiments only in the configuration and operation, and may be the same as those of the first to third example embodiments in the other parts. For this reason, a part that is different from each of the example embodiments described above will be described in detail below, and a description of other overlapping parts will be omitted as appropriate.

(Functional Configuration)

First, with reference to FIG. 11, a functional configuration of the information processing apparatus 10 according to the fourth example embodiment will be described. FIG. 11 is a block diagram illustrating the functional configuration of the information processing apparatus according to the fourth example embodiment. In FIG. 11, the same components as those illustrated in FIG. 2 carry the same reference numerals.

Figure 11:
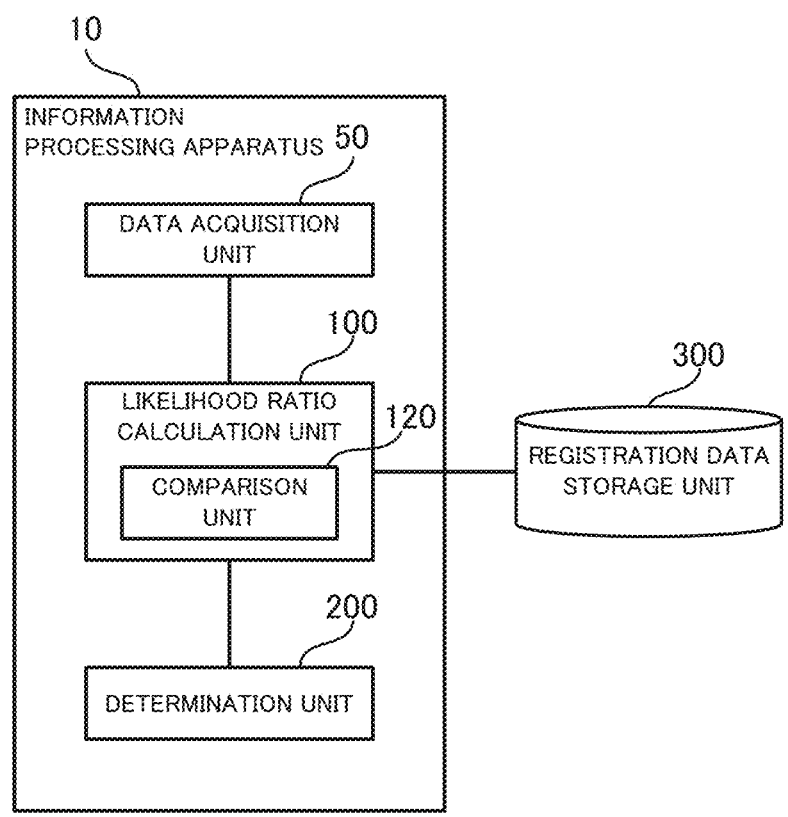
FIG. 11 is a block diagram illustrating a functional configuration of an information processing apparatus according to a fourth example embodiment.

As illustrated in FIG. 11, the information processing apparatus 10 according to the fourth example embodiment includes, as processing blocks for realizing the functions thereof, the data acquisition unit 50, the likelihood ratio calculation unit 100, and the determination unit 200. Then, the likelihood ratio calculation unit 100 according to the fourth example embodiment especially includes a comparison unit 120. The comparison unit 120 may be realized or implemented by the processor 11 (see FIG. 1), for example.

The comparison unit 120 is configured to compare a feature vector generated by performing a predetermined process on the query vector extracted from the series data, with the target vector. More specifically, the comparison unit 120 is configured to calculate a degree of similarity between the feature vector generated from the query vector, and the target vector. The comparison unit 120 may calculate a cosine similarity degree between the feature vector generated from the query vector, and the target vector. The comparison unit 120 may calculate a similarity degree other than the cosine similarity degree. The similarity degree calculated by the comparison unit 120 is used to calculate the likelihood ratio.

(Flow of Operation)

Next, with reference to FIG. 12, a flow of operation of the information processing apparatus 10 according to the fourth example embodiment will be described. FIG. 12 is a flowchart illustrating the flow of the operation of the information processing apparatus according to the fourth example embodiment. In FIG. 12, the same steps as those illustrated in FIG. 3 carry the same reference numerals.

Figure 12:
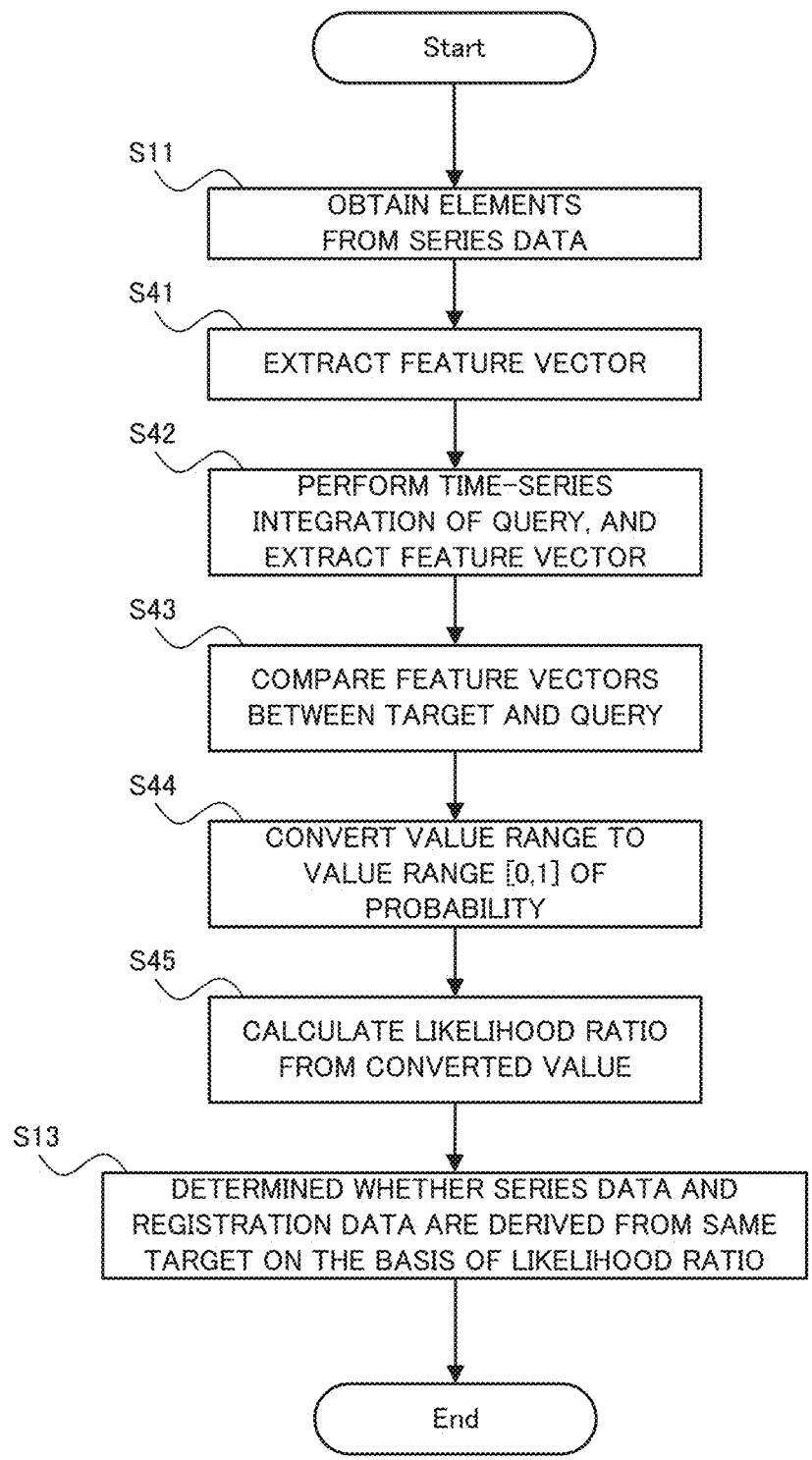
FIG. 12 is a flowchart illustrating a flow of operation of the information processing apparatus according to the fourth example embodiment.

As illustrated in FIG. 12, when the operation of the information processing apparatus 10 according to the fourth example embodiment is started, first, the data acquisition unit 50 obtains elements included in the series data (step S11). The data acquisition unit 50 outputs the obtained elements of the series data to the likelihood ratio calculation unit 100.

Subsequently, the likelihood ratio calculation unit 100 extracts the feature vector (i.e., the query vector) from the obtained elements of the series data (step S41). When the query vector is extracted, the likelihood ratio calculation unit 100 performs time series integration by using the query vector and extracts the feature vector (step S42). The likelihood ratio calculation unit 100 inputs the query vector to the LSTM, and obtains the feature vector as an output thereof, for example. The LSTM here is an example, and the same process may be performed by using an arbitrary recursive neural network. For example, a RNN may be used to extract the feature vector.

Subsequently, the comparison unit 120 compares the feature vector extracted from the query vector with the target vector to calculate the degree of similarity between those vectors (step S43). The target vector may be extracted in advance when the registration data are registered or in similar cases. In this case, the target vector may be stored in the registration data storage unit 300 together with the registration data, and the comparison unit 120 reads the target vector from the registration data storage unit 300 to calculate the similarity. Alternatively, the target vector may be newly extracted from the registration data when the degree of similarity is calculated. In this case, the comparison unit 120 performs a process of reading the registration data from the registration data storage unit 300 and of extracting the target vector from the registration data. Then, the comparison unit 120 compares the extracted target vector, with the feature vector extracted from the query vector, to calculate the degree of similarity.

Subsequently, the likelihood ratio calculation unit 100 converts the value range of the calculated degree of similarity into the value range of probability (step S44). For example, when the cosine similarity degree is calculated as the degree of similarity, the likelihood ratio calculation unit 100 converts the value range [−1, 1] of the cosine similarity degree into the value range [0, 1] of the probability.

Subsequently, the likelihood ratio calculation unit 100 calculates the likelihood ratio from the converted value (step S45). The likelihood ratio calculated in this manner is a value that takes into account the degree of similarity or difference between the series data and the registration data. Specifically, the degree of similarity between the feature vector extracted from the query vector and the target vector is calculated, and the likelihood ratio is calculated on the basis of the value obtained by converting the degree of similarity. Consequently, the calculated likelihood ratio takes into account the degree of similarity or difference between the series data and the registration data.

Lastly, the determination unit 200 determines whether or not the series data and the registration data are derived from the same target on the basis of the calculated likelihood ratio (step S13).

Specific Example of Operation

Next, with reference to FIG. 13, a specific example of the operation of the information processing apparatus 10 according to the fourth example embodiment will be described. FIG. 13 is a conceptual diagram illustrating the specific example of the operation of the information processing apparatus according to the fourth example embodiment. In the operation example illustrated in FIG. 13, as described in the second example embodiment (see FIG. 5 to FIG. 7), it is determined whether or not the series data and the registration data are derived from the same person.

Figure 13:
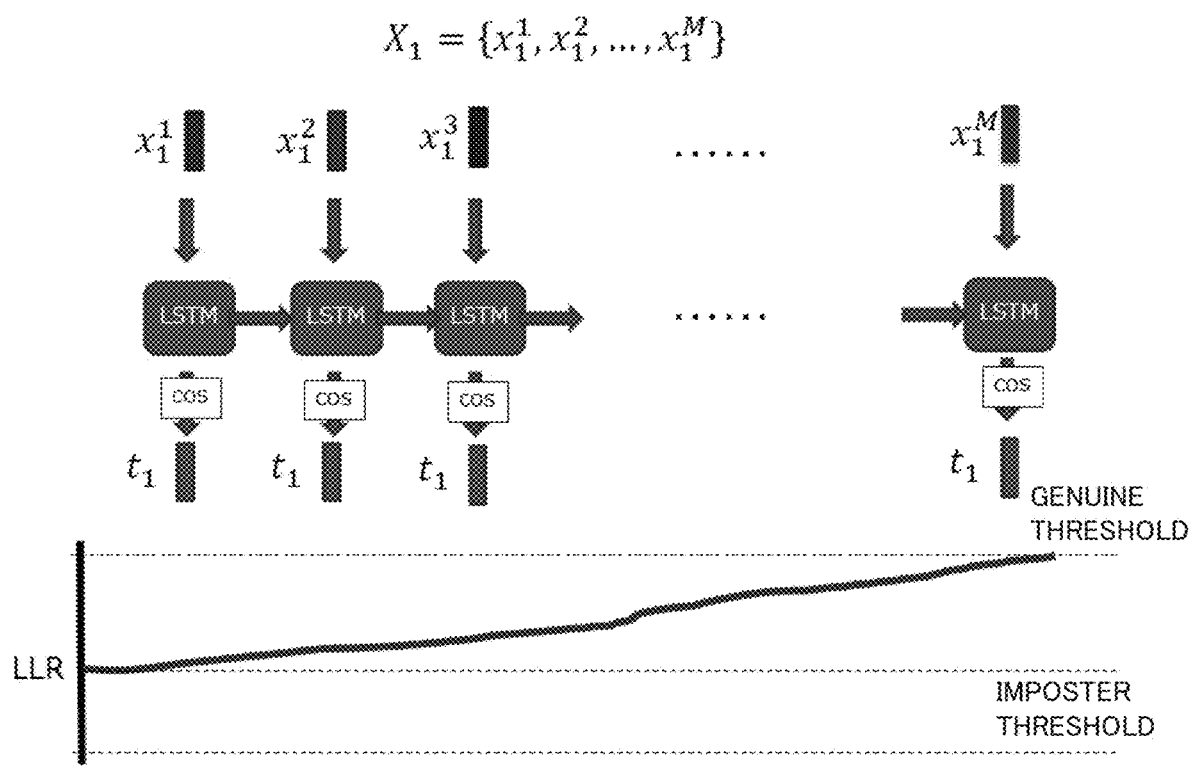
FIG. 13 is a conceptual diagram illustrating a specific example of the operation of the information processing apparatus according to the fourth example embodiment.

In FIG. 13, the query vector is expressed as $X_1 = \{x_1^1, x_1^2, \ldots, x_1^M\}$ and the target vector is expressed as $t_1$. In this case, the comparison unit 120 sequentially calculates the degree of similarity between the feature vector extracted from the query vector corresponding to each element and the target vector.

Specifically, first, the likelihood ratio calculation unit 100 inputs the query vector $x1^1$ to the LSTM to extract the feature vector. Then, the comparison unit 120 calculates the degree of similarity between the feature vector extracted from the query vector $x_1^1$ and the target vector $t_1$. Then, the likelihood ratio calculation unit 100 converts the calculated degree of similarity to calculate the likelihood ratio. Subsequently, the likelihood ratio calculation unit 100 inputs the query vector $x_1^2$ to the LSTM to extract the feature vector. Then, the comparison unit 120 calculates the degree of similarity between the feature vector extracted from the query vector $x_1^2$ and the target vector $t_1$. Then, the likelihood ratio calculation unit 100 converts the calculated degree of similarity to calculate the likelihood ratio. Such a process is repeated in the same manner, and the likelihood ratio calculation unit 100 lastly inputs the query vector $x_1^M$ to the LSTM to extract the feature vector. Then, the comparison unit 120 calculates the degree of similarity between the feature vector extracted from the query vector $x_1^M$ and the target vector $t_1$. Then, the likelihood ratio calculation unit 100 converts the calculated degree of similarity to calculate the likelihood ratio.

In the example illustrated in FIG. 13, the determination is performed by comparing the likelihood ratio calculated by the above process with the genuine threshold and the imposter threshold. In the example illustrated in FIG. 13, the likelihood ratio gradually changes toward the genuine threshold, and in the end, it reaches the genuine threshold. Therefore, the determination unit 200 determines that the series data and the registration data are derived from the same person.

(Technical Effect)

Next, a technical effect obtained by the information processing apparatus 10 according to the fourth example embodiment will be described.

As described in FIG. 11 to FIG. 13, in the information processing apparatus 10 according to the fourth example embodiment, the feature vector is extracted from the query vector, and the degree of similarity is calculated by comparing the extracted feature vector with the target vector. Then, the process of calculating the likelihood ratio is performed on the basis of the calculated degree of similarity. The likelihood ratio calculated in this manner is a value that takes into account the degree of similarity or difference between the series data and the registration data. Therefore, according to the information processing apparatus 10 in the fourth example embodiment, it is possible to determine whether or not the series data and the registration data are derived from the same target on the basis of the calculated likelihood ratio.

Fifth Example Embodiment

The information processing apparatus 10 according to a fifth example embodiment will be described with reference to FIG. 14 to FIG. 16. The fifth example embodiment is partially different from the first to fourth example embodiments only in the configuration and operation, and may be the same as those of the first to fourth example embodiments in the other parts. For this reason, a part that is different from each of the example embodiments described above will be described in detail below, and a description of other overlapping parts will be omitted as appropriate.

(Functional Configuration)

First, with reference to FIG. 14, a functional configuration of the information processing apparatus 10 according to the fifth example embodiment will be described. FIG. 14 is a block diagram illustrating the functional configuration of the information processing apparatus according to the fifth example embodiment. In FIG. 14, the same components as those illustrated in FIG. 2 carry the same reference numerals.

Figure 14:
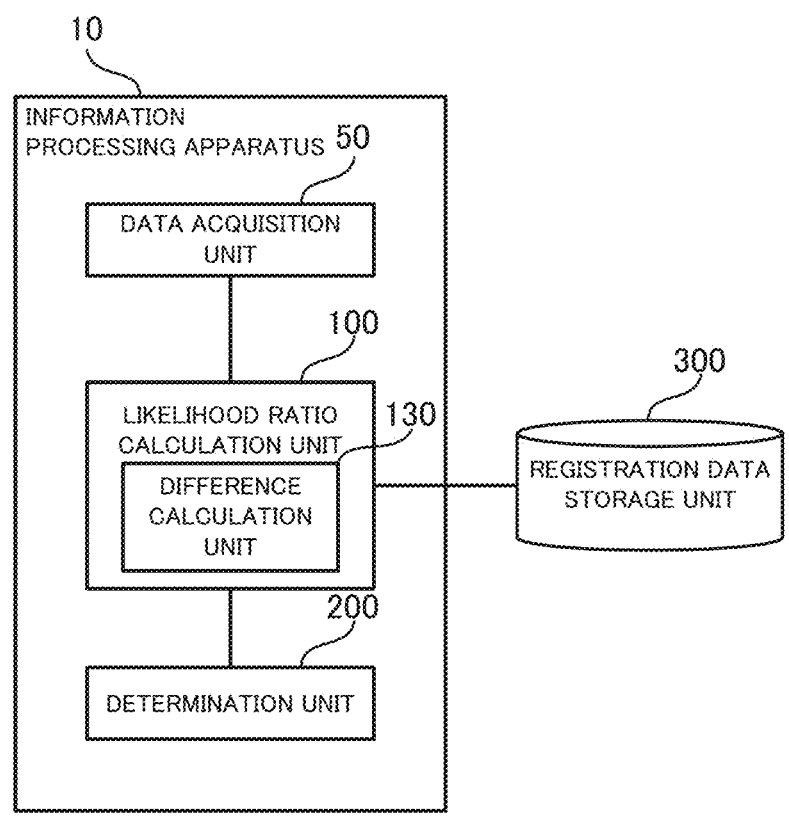
FIG. 14 is a block diagram illustrating a functional configuration of an information processing apparatus according to a fifth example embodiment.

As illustrated in FIG. 14, the information processing apparatus 10 according to the fifth example embodiment includes, as processing blocks for realizing the functions thereof, the data acquisition unit 50, the likelihood ratio calculation unit 100, and the determination unit 200. The likelihood ratio calculation unit 100 according to the fifth example embodiment especially includes a difference calculation unit 130. The difference calculation unit 130 may be realized or implemented by the processor 11 (see FIG. 1), for example.

The difference calculation unit 130 is configured to calculate or arithmetically operate a difference between the query vector extracted from the series data and the target vector extracted from the registration data. The difference calculation unit 130 calculates a difference vector as the difference between the query vector and the target vector. The difference vector calculated by the difference calculation unit 130 is used to calculate the likelihood ratio.

(Flow of Operation)

Next, with reference to FIG. 15, a flow of operation of the information processing apparatus 10 according to the fifth example embodiment will be described. FIG. 15 is a flowchart illustrating the flow of the operation of an information processing apparatus according to the fifth example embodiment. In FIG. 15, the same steps as those illustrated in FIG. 3 carry the same reference numerals.

Figure 15:
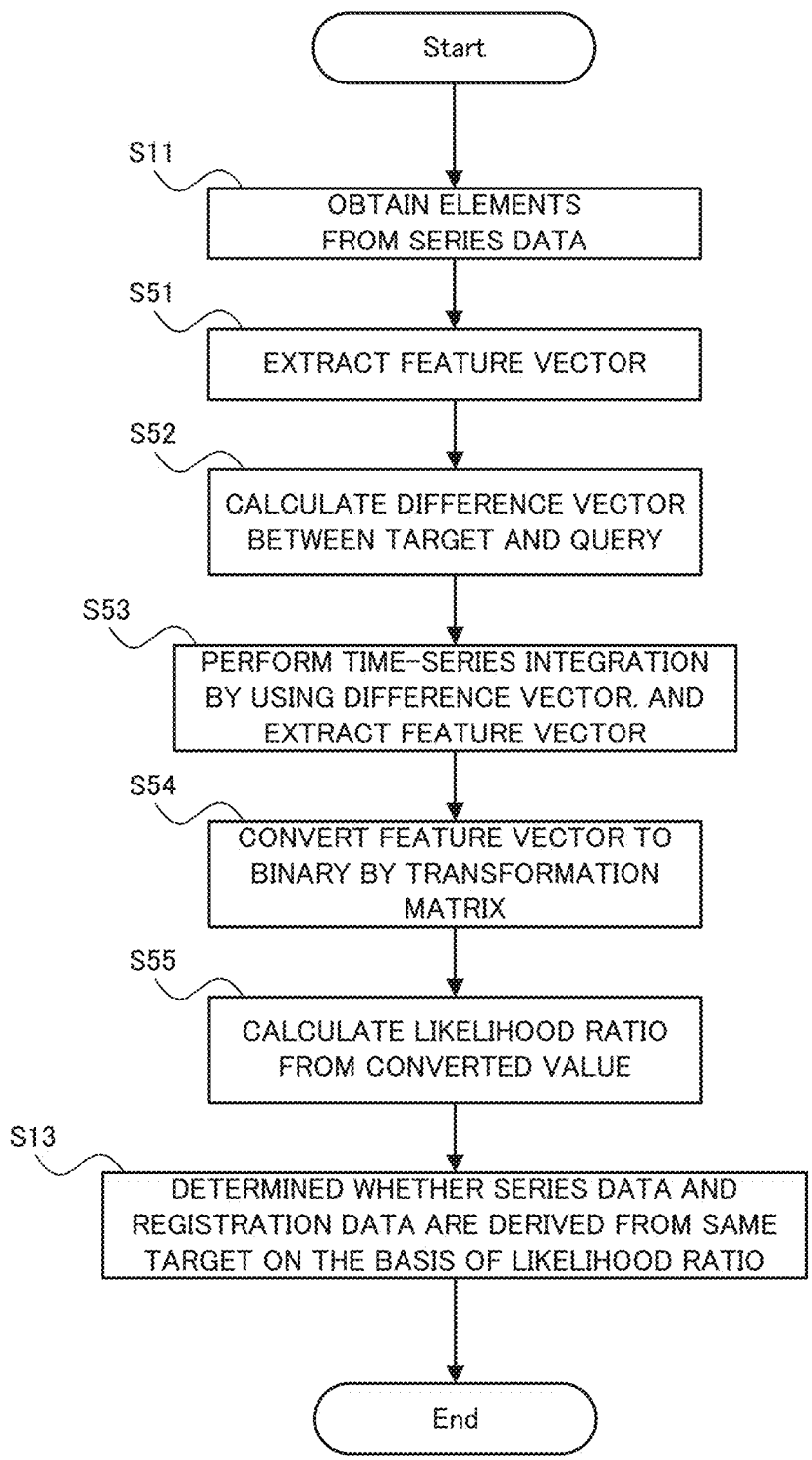
FIG. 15 is a flowchart illustrating a flow of operation of the information processing apparatus according to the fifth example embodiment.

As illustrated in FIG. 15, when the operation of the information processing apparatus 10 according to the fifth example embodiment is started, first, the data acquisition unit 50 obtains elements included in the series data (step S11). The data acquisition unit 50 outputs the obtained elements of the series data to the likelihood ratio calculation unit 100.

Subsequently, the likelihood ratio calculation unit 100 extracts the feature vector (i.e., the query vector) from the obtained elements of the series data (step S51). When the query vector is extracted, the difference calculation unit 130 calculates the difference vector as the difference between the query vector and the target vector (step S52). The target vector may be extracted in advance when the registration data are registered or in similar cases. In this case, the target vector may be stored in the registration data storage unit 300 together with the registration data, and the difference calculation unit 130 reads the target vector from the registration data storage unit 300 to calculate the difference from the query vector. Alternatively, the target vector may be newly extracted from the registration data when the difference vector is calculated. In this case, the difference calculation unit 130 performs a process of reading the registration data from the registration data storage unit 300 and of extracting the target vector from the registration data. Then, the difference calculation unit 130 calculates the difference between the extracted target vector and the query vector.

Subsequently, the likelihood ratio calculation unit 100 performs time series integration by using the difference vector, and extracts the feature vector (step S53). The likelihood ratio calculation unit 100 inputs the difference vector to the LSTM, and obtains the feature vector as and output thereof, for example. The LSTM here is an example, and the same process may be performed by using an arbitrary recursive neural network. For example, a RNN may be used to extract the feature vector.

Subsequently, the likelihood ratio calculation unit 100 converts the feature vector to a binary by a transformation matrix (step S54). Specifically, the likelihood ratio calculation unit 100 converts the feature vector to a binary indicating that the series data and the registration data are derived from the same target and that the series data and the registration data are not derived from the same target. The likelihood ratio calculation unit 100 converts (i.e., scales) each value range of the binary to [0, 1].

Subsequently, the likelihood ratio calculation unit 100 calculates the likelihood ratio from the converted value (step S55). The likelihood ratio calculated in this manner is a value that takes into account the degree of similarity or difference between the series data and the registration data. Specifically, the difference between the query vector extracted from the series data and the target vector extracted from the registration data is calculated, and the likelihood ratio is calculated on the basis of the difference vector. Consequently, the calculated likelihood ratio takes into account the similarity degree or the difference degree of the series data and the registration data as a result.

Lastly, the determination unit 200 determines whether or not the series data and the registration data are derived from the same target on the basis of the calculated likelihood ratio (step S13).

Specific Example of Operation

Next, with reference to FIG. 16, a specific example of operation of the information processing apparatus 10 according to the fifth example embodiment will be described. FIG. 16 is a conceptual diagram illustrating the specific example of the operation of the information processing apparatus according to the fifth example embodiment. In the operation example illustrated in FIG. 15, as described in the second example embodiment (see FIG. 5 to FIG. 7), it is determined whether or not the series data and the registration data are derived from the same person.

Figure 16:
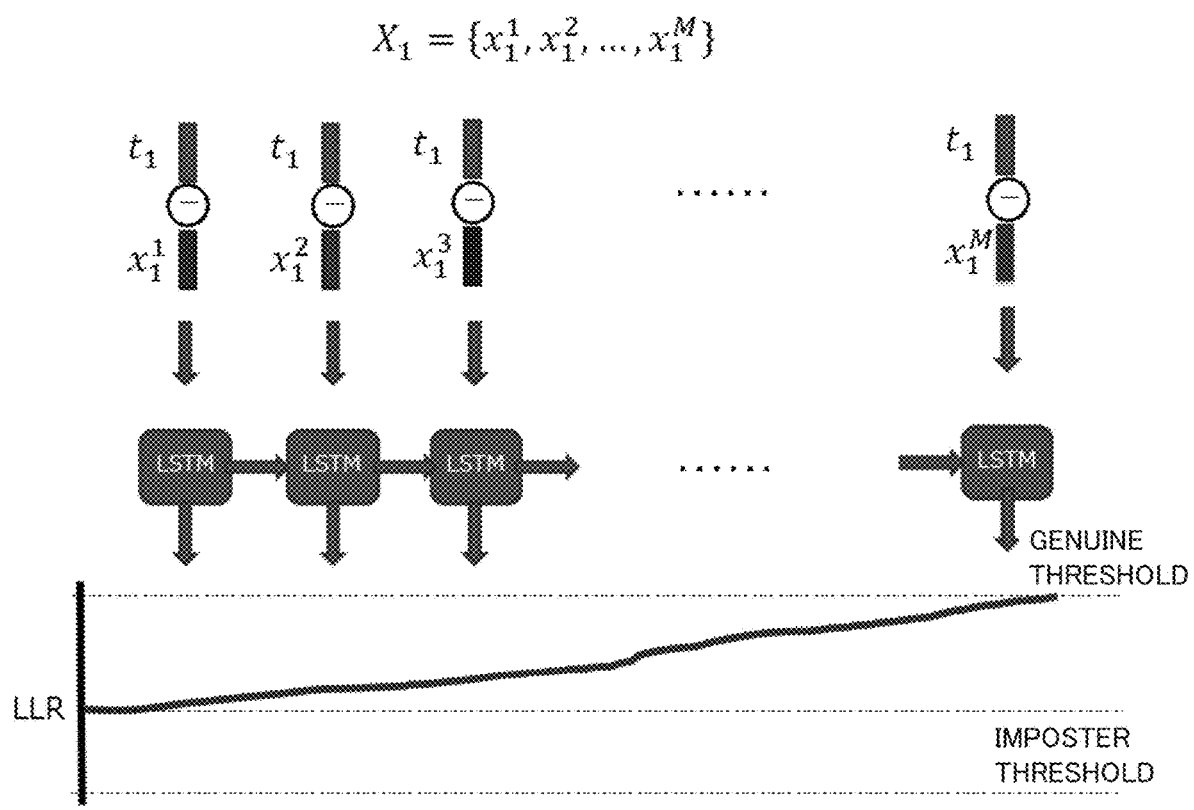
FIG. 16 is a conceptual diagram illustrating a specific example of the operation of the information processing apparatus according to the fifth example embodiment.

In FIG. 16, the query vector is expressed as $X_1 = \{x_1^1, x_1^2, \ldots, x_1^M\}$ and the target vector is expressed as $t_1$. In this case, the difference calculation unit 130 sequentially calculates the difference between the query vector corresponding to each element and the target vector.

Specifically, first, the difference calculation unit 130 calculates the difference between the query vector $x_1^1$ and the target vector $t_1$ to generate a difference vector $t_1 - x_1^1$. Then, the difference vector $t_1 - x_1^1$ is inputted to the LSTM to extract the feature vector, and the likelihood ratio is calculated from the value obtained by converting the feature vector. Subsequently, the difference calculation unit 130 calculates the difference between the query vector $x_1^2$ and the target vector $t_1$ to generate a difference vector $t_1 - x_1^2$. Then, the difference vector $t_1 - x_1^2$ is inputted to the LSTM to extract the feature vector, and the likelihood ratio is calculated from the value obtained by converting the feature vector. Such a process is repeated in the same manner, and the difference calculation unit 130 lastly calculates the difference between the query vector $x_1^M$ and the target vector $t_1$ to generate a difference vector $t_1 - x_1^M$. Then, the difference vector $t_1 - x_1^M$ is inputted to the LSTM to extract the feature vector, and the likelihood ratio is calculated from the value obtained by converting the feature vector.

In the example illustrated in FIG. 16, the determination is performed by comparing the likelihood ratio calculated by the above process with the genuine threshold and the imposter threshold. In the example illustrated in FIG. 16, the likelihood ratio gradually changes toward the genuine threshold, and lastly reaches the genuine threshold. Therefore, the determination unit 200 determines that the series data and the registration data are derived from the same person.

(Technical Effect)

Next, a technical effect obtained by the information processing apparatus 10 according to the fifth example embodiment will be described.

As described in FIG. 14 to FIG. 16, in the information processing apparatus 10 according to the fifth example embodiment, the following process is performed: calculating the difference vector as the difference between the query vector and the target vector, and extracting the likelihood ratio by using the difference vector. The likelihood ratio calculated in this manner is a value that takes into account the degree of similarity or difference between the series data and the registration data. Therefore, according to the information processing apparatus 10 in the fifth example embodiment, it is possible to determine whether or not the series data and the registration data are derived from the same target on the basis of the calculated likelihood ratio.

Sixth Example Embodiment

The information processing apparatus 10 according to a sixth example embodiment will be described with reference to FIG. 17 and FIG. 18. The sixth example embodiment selectively utilizes a combination of the third to fifth example embodiments, and may be generally the same as the third to fifth example embodiments in the configuration and operation. For this reason, a part that is different from each of the example embodiments described above will be described in detail below, and a description of other overlapping parts will be omitted as appropriate.

(Functional Configuration)

First, with reference to FIG. 17, a functional configuration of the information processing apparatus 10 according to the sixth example embodiment will be described. FIG. 17 is a block diagram illustrating the functional configuration of the information processing apparatus according to the sixth example embodiment. In FIG. 17, the same components as those illustrated in FIG. 8, FIG. 11 and FIG. 14 carry the same reference numerals.

Figure 17:
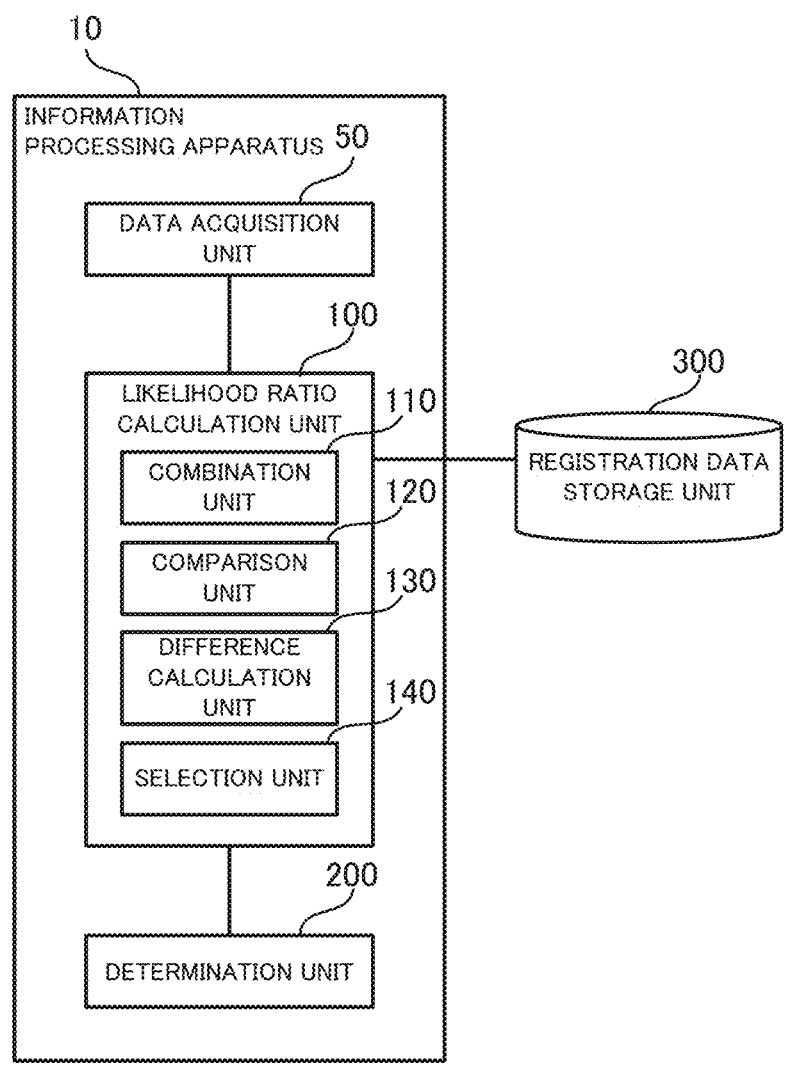
FIG. 17 is a block diagram illustrating a functional configuration of an information processing apparatus according to a sixth example embodiment.

As illustrated in FIG. 17, the information processing apparatus 10 according to the sixth example embodiment includes, as processing blocks for realizing the functions thereof, the data acquisition unit 50, the likelihood ratio calculation unit 100, and the determination unit 200. The likelihood ratio calculation unit 100 according to the sixth example embodiment especially includes the combination unit 110, the comparison unit 120, the difference calculation unit 130, and a selection unit 140. That is, the likelihood ratio calculation unit 100 according to the sixth example embodiments includes the combination unit 110 described in the third example embodiment, the comparison unit 120 described in the fourth example embodiment, and the difference calculation unit 130 described in the fifth example embodiment, and in addition to them, the selection unit 140 is further included. The selection unit 140 may be realized or implemented by the processor 11 (see FIG. 1), for example.

The selection unit 140 is configured to select which of the combination unit 110, the comparison unit 120, and the difference calculation unit 130 is used when the likelihood ratio is calculated. That is, the selection unit 140 is configured to select which is used to calculate the likelihood ratio from among the technique of calculating the likelihood ratio by using the combined vector described in the third example embodiment (see FIG. 8 to FIG. 10), the technique of calculating the likelihood ratio by using the degree of similarity described in the fourth example embodiment (see FIG. 11 to FIG. 13), and the technique of calculating the likelihood ratio by using the difference vector described in the fifth example embodiment (see FIG. 14 to FIG. 16).

The selection unit 140 selects which of the combination unit 110, the comparison unit 120, and the difference calculation unit 130 is used, on the basis of a condition information obtained in advance. The condition information is information for determining which is optimal to calculate the likelihood ratio among the combination unit 110, the comparison unit 120, and the difference calculation unit 130. The condition information may be information about the type of the series data and the registration data, for example. For example, information indicating that the series data and the registration data are image data, and information indicating that the series data and the registration data are audio data, may be obtained as the condition information. The condition information may be information about the quality of the series data and the registration data, for example. For example, when the series data and the registration data are the image data or the audio data, information indicating definition or clarity may be obtained as the condition information. The condition information may be information about an environment in which the series data and the registration data are obtained. For example, when the series data and the registration data are the image data or the audio data, information about a place where the data are obtained and a surrounding environment, information about a camera used to obtain the image data, information about a microphone used to obtain the audio data, or the like may be obtained as the condition information.

(Flow of Operation)

Next, with reference to FIG. 18, a flow of operation of the information processing apparatus 10 according to the sixth example embodiment will be described. FIG. 18 is a flowchart illustrating the flow of the operation of the information processing apparatus according to the sixth example embodiment.

Figure 18:
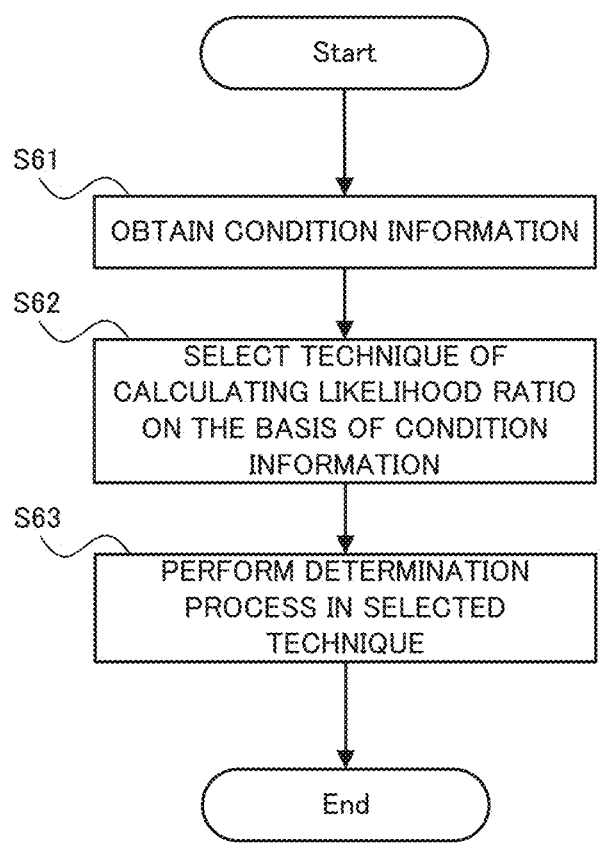
FIG. 18 is a flowchart illustrating a flow of operation of the information processing apparatus according to the sixth example embodiment.

As illustrated in FIG. 18, when the operation of the information processing apparatus 10 according to the sixth example embodiment is started, first, the selection unit 140 obtains the condition information (step S61). Then, the selection unit 140 selects which of the combination unit 110, the comparison unit 120, and the difference calculation unit 130 is used when the likelihood ratio is calculated, on the basis of the condition information (step S62).

After that, the information processing apparatus 10 performs the determination process (i.e., the process of calculating the likelihood ratio and of determining whether or not the series data and the registration data are derived from the same target) by using the technique selected by selection unit 140 (step S63). Specifically, when the selection unit 140 selects the combination unit 110, the determination process described in the third example embodiment (see FIG. 9) is performed. When the selection unit 140 selects the comparison unit 120, the determination process described in the fourth example embodiment (see FIG. 12) is performed. When the selection unit 140 selects the difference calculation unit 130, the determination process described in the fifth example embodiment (see FIG. 15) is performed.

The above example exemplifies that the condition information is obtained and the technique of calculating the likelihood ratio is selected before the determination process is performed, but the condition information may be obtained and the technique of calculating the likelihood ratio may be selected in the middle of the determination process. For example, after the data acquisition unit obtains elements from the series data (i.e., after the step S11), the condition information may be obtained, and the technique of calculating the likelihood ratio may be selected. Immediately before the combined vector is generated by the combination unit 110 (i.e., immediately before the step S32 in FIG. 9), the condition information may be obtained and the technique of calculating the likelihood ratio may be selected. Immediately before the degree of similarity is calculated by the comparison unit 120 (i.e., immediately before the step S43 in FIG. 12), the condition information may be obtained and the technique of calculating the likelihood ratio may be selected. Immediately before the difference vector is calculated by the difference calculation unit 130 (i.e., immediately before the step S52 in FIG. 15), the condition information may be obtained and the technique of calculating the likelihood ratio may be selected.

(Technical Effect)

Next, a technical effect obtained by the information processing apparatus 10 according to the sixth example embodiment will be described.

As described in FIG. 17 and FIG. 18, in the information processing apparatus 10 according to the sixth example embodiment, the selection unit 140 selects which of the combination unit 110, the comparison unit 120, and the difference calculation unit 130 is used when the likelihood ratio is calculated. In this way, it is possible to calculate the likelihood ratio by selecting an optimum method from among the three units that are the combination unit 110, the comparison unit 120, and the difference calculation unit 130. Therefore, it is possible to accurately determine whether the series data and the registration data are derived from the same target.

Modified Example of Sixth Example Embodiment

The information processing apparatus 10 according to a modified example of the sixth example embodiment will be described with reference to FIG. 19 and FIG. 20. A modified example of the sixth example embodiment is partially different from the sixth example embodiment in the configuration and operation, and may be the same as the sixth example embodiment in the other parts. For this reason, a part that is different from each of the example embodiments described above will be described in detail below, and a description of other overlapping parts will be omitted as appropriate.

(Functional Configuration)

First, with reference to FIG. 19, a functional configuration of the information processing apparatus 10 according to the modified example of the sixth example embodiment will be described. FIG. 19 is a block diagram illustrating the functional configuration of the information processing apparatus according to the modified example of the sixth example embodiment. In FIG. 19, the same components as those illustrated in FIG. 8, FIG. 11 and FIG. 14 carry the same reference numerals.

Figure 19:
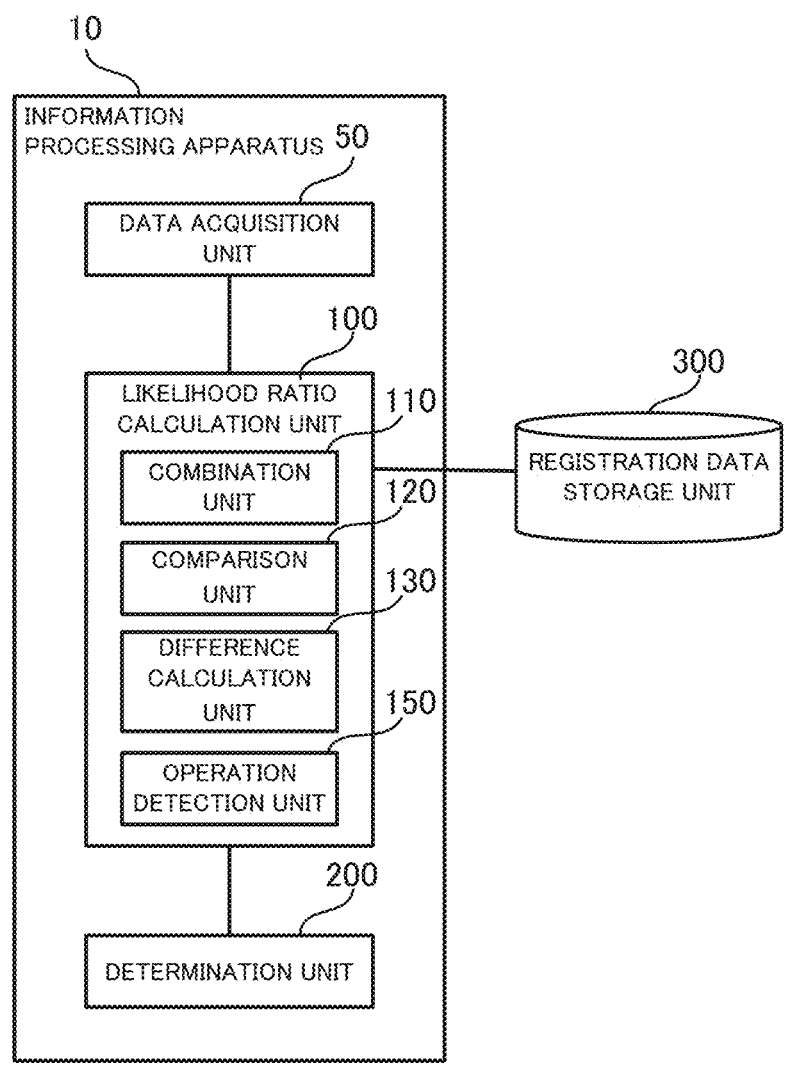
FIG. 19 is a block diagram illustrating a functional configuration of an information processing apparatus according to a modified example of the sixth example embodiment.

As illustrated in FIG. 19, the information processing apparatus 10 according to the modified example of the sixth example embodiment includes, as processing blocks for realizing the functions thereof, the data acquisition unit 50, the likelihood ratio calculation unit 100, and the determination unit 200. The likelihood ratio calculation unit 100 according to the modified example of the sixth example embodiment especially includes the combination unit 110, the comparison unit 120, the difference calculation unit 130, and an operation detection unit 150. That is, the likelihood ratio calculation unit 100 according to the modified example of the sixth example embodiment includes the combination unit 110 described in the third example embodiment, the comparison unit 120 described in the fourth example embodiment, and the difference calculation unit 130 described in the fifth example embodiment, and in addition to them, the operation detection unit 150 is further included. The operation detection unit 150 may be realized or implemented by the processor 11 (see FIG. 1), for example.

The operation detection unit 150 is configured to detect an operation by the user. Specifically, the operation detection unit 150 is configured to detect an operation of selecting which of the combination unit 110, the comparison unit 120, and the difference calculation unit 130 is used when the likelihood ratio is calculated (hereinafter referred to as a "selection operation" as appropriate). In other words, the operation detection unit 150 is configured to detect the operation of selecting which is used to calculate the likelihood ratio from among the technique of calculating the likelihood ratio by using the combined vector described in the third example embodiment (see FIG. 8 to FIG. 10), the technique of calculating the likelihood ratio by using the degree of similarity described in the fourth example embodiment (see FIG. 11 to FIG. 13), and the technique of calculating the likelihood ratio by using the difference vector described in the fifth example embodiment (see FIG. 14 to FIG. 16). The operation detection unit 150 may detect the user's operation of the selection by the input apparatus 15 (see FIG. 1), for example.

(Flow of Operation)

Next, with reference to FIG. 20, a flow of operation of the information processing apparatus 10 according to the modified example of the sixth example embodiment will be described. FIG. 20 is a flowchart illustrating the flow of the operation of the information processing apparatus according to the modified example of the sixth example embodiment.

Figure 20:
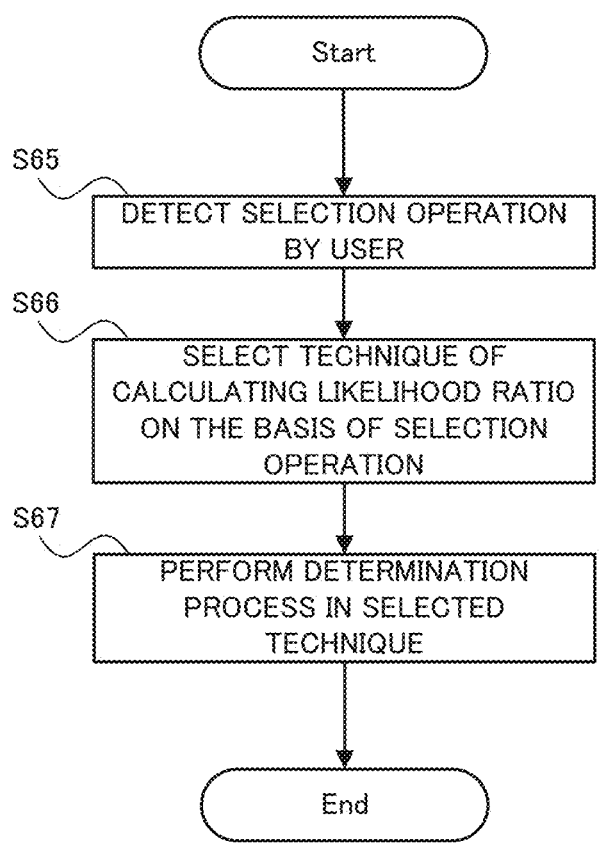
FIG. 20 is a flowchart illustrating a flow of operation of the information processing apparatus according to the modified example of the sixth example embodiment.

As illustrated in FIG. 20, when the operation of the information processing apparatus 10 according to the modified example of the sixth example embodiment is started, first, the operation detection unit 150 detects the selection operation by the user (step S65). The operation detection unit 150 selects which of the combination unit 110, the comparison unit 120, and the difference calculation unit 130 is used when the likelihood ratio is calculated, on the basis of the detected selection operation (step S66).

When the user's selection operation is accepted, a notice or the like to prompt the user to perform the selection operation may be provided. For example, the user may be notified in audio through a speaker or the like to perform the selection operation. Furthermore, the user may be notified to perform the selection operation on a screen display by using a display or the like. In the case of the screen display, the user may touch the screen to perform the selection operation. For example, an operation of the user touching any of three areas respectively corresponding to the combination unit 110, the comparison unit 120, and the difference calculation unit 130 that are displayed on the screen, may be detected as the selection operation.

After that, the information processing apparatus 10 performs the determination process (i.e., the process of calculating the likelihood ratio and of determining whether or not the series data and the registration data are derived from the same target) by using the technique corresponding to the user's selection operation (step S67). Specifically, when the user performs the operation of selecting the combination unit 110, the determination process described in the third example embodiment (see FIG. 9) is performed. When the user performs the operation of selecting the comparison unit 120, the determination process described in the fourth example embodiment (see FIG. 12) is performed. When the user performs the operation of selecting the difference calculation unit 130, the determination process described in the fifth example embodiment (see FIG. 15) is performed.

The above example exemplifies that the selection operation by the user is detected before the determination process is performed, but the selection operation may be detected in the middle of the determination process. For example, after the data acquisition unit obtains elements from the series data (i.e., after the step S11), the selection operation may be detected. Immediately before the combined vector is generated by the combination unit 110 (i.e., immediately before the step S32 in FIG. 9), the selection operation may be detected. Immediately before the degree of similarity is calculated by the comparing part 120 (i.e., immediately before the step S43 in FIG. 12), the selection operation may be detected. Immediately before the difference vector is calculated by the difference calculation unit 130 (i.e., immediately before the step S52 in FIG. 15), the selection operation may be detected.
(Technical Effect)

Next, a technical effect obtained by the information processing apparatus 10 according to a modified example of the sixth example embodiment will be described.

As described in FIG. 19 and FIG. 20, in the information processing apparatus 10 according to the modified example of the sixth example embodiment, which of the combination unit 110, the comparison unit 120, and the difference calculation unit 130 is used when the likelihood ratio is calculated, is selected in accordance with the user's operation. In this way, it is possible to calculate the likelihood ratio by selecting an optimum method from among the three units that are the combination unit 110, the comparison unit 120, and the difference calculation unit 130. Therefore, it is possible to accurately determine whether the series data and the registration data are derived from the same target.

The sixth example embodiment and the modified example of the sixth example embodiment exemplifies that the three units that are the combination unit 110, the comparative unit 120, and the difference calculation unit 130, the combination unit 110, the comparison unit 120 are selectively used, but two of the combination unit 110, the comparative unit 120, and the difference calculation unit 130, may be selectively used. For example, the combination unit 110 and the comparison unit 120 may be selectively used. The combination unit 110 and the difference calculation unit 130 may be selectively used. The comparison unit 120 and the difference calculation unit 130 may be selectively used.

Seventh Example Embodiment

The information processing apparatus 10 according to a seventh example embodiment will be described with reference to FIG. 21 and FIG. 22. The seventh example embodiment is partially different from the first to sixth example embodiments only in the configuration and operation, and may be the same as the first to sixth example embodiments in the other parts. For this reason, a part that is different from each of the example embodiments described above will be described in detail below, and a description of other overlapping parts will be omitted as appropriate.
(Determination For A Plurality of Registration Data)

First, with reference to FIG. 21, a description will be given to a determination for a plurality of registration data performed by the information processing apparatus 10 according to the seventh example embodiment. FIG. 21 is a diagram conceptually illustrating the determination for the plurality of registration data in the information processing apparatus according to the seventh example embodiment.

Figure 21:
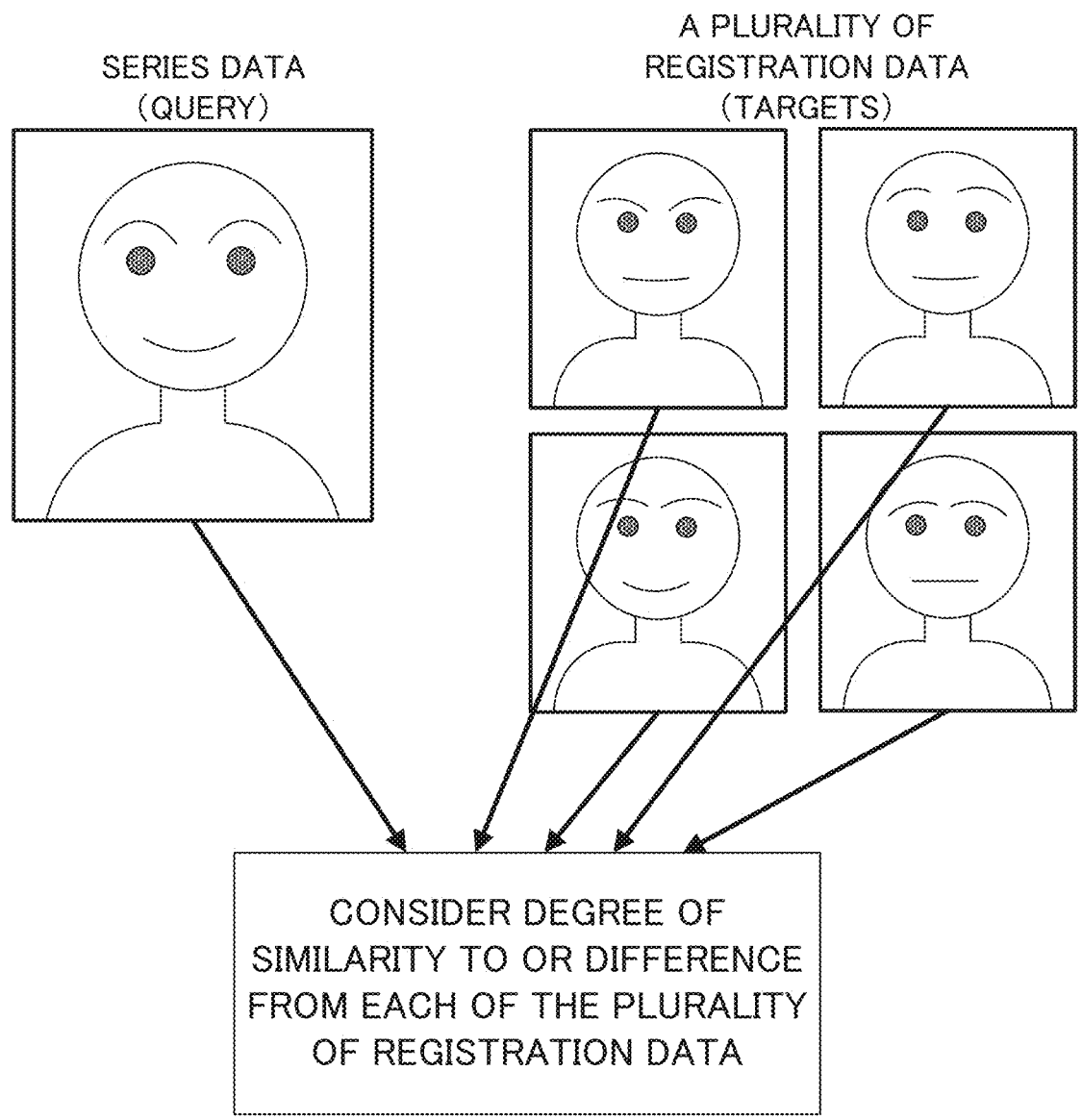
FIG. 21 is a diagram conceptually illustrating a determination for a plurality of registration data in the information processing apparatus according to the seventh example embodiment.

As illustrated in FIG. 21, in the information processing apparatus 10 according to the seventh example embodiment, a plurality of registration data are determination targets for the inputted series data. That is, it is configured to determine whether or not a single query and a plurality of targets are derived from the same target. For example, as illustrated in FIG. 21, it is assumed that face images of a plurality of persons are registered as a plurality of registration data. In this case, it is determined whether a person in an image inputted as the series data and any of the registered plurality of persons are the same person. As described above, when the plurality of registration data are the determination targets, the likelihood ratio may be calculated in view of the series data and each of the plurality of registration data. Specifically, a plurality of likelihood ratios may be calculated in view of a degree of similarity or difference between the series data and each of the plurality of registration data.
(Flow of Operation)

Next, with reference to FIG. 22, a flow of operation of the information processing apparatus 10 according to the seventh example embodiment will be described. FIG. 22 is a flowchart illustrating the flow of the operation of the information processing apparatus according to the seventh example embodiment. In FIG. 22, the same steps as those illustrated in FIG. 3 carry the same reference numerals.

Figure 22:
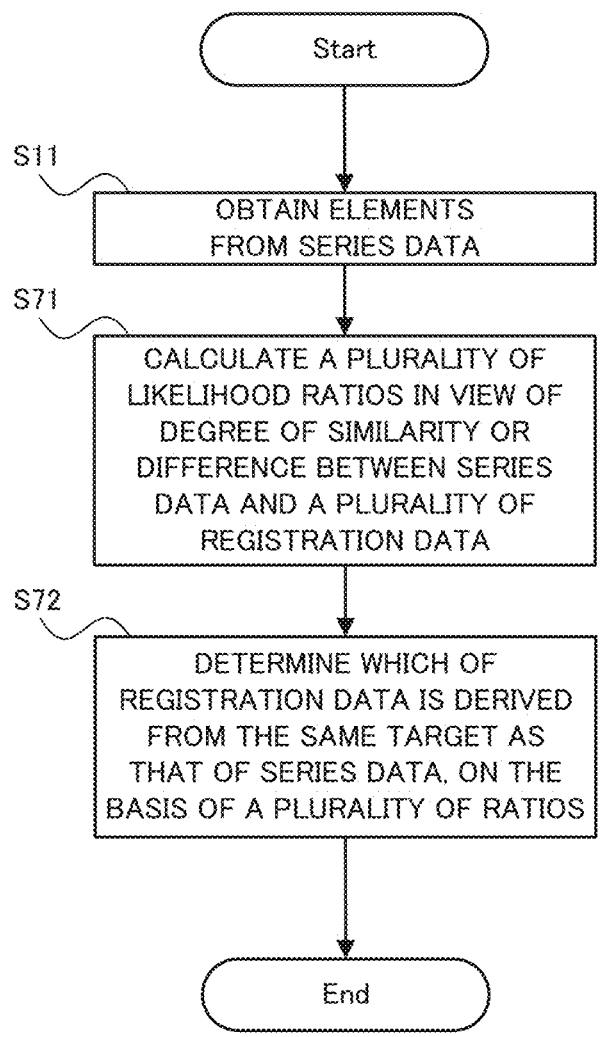
FIG. 22 is a flowchart illustrating a flow of operation of an information processing apparatus according to a modified example of the seventh example embodiment.

As illustrated in FIG. 22, when the operation of the information processing apparatus 10 according to the seventh example embodiment is started, first, the data acquisition unit 50 obtains elements included in the series data (step S11). The data acquisition unit 50 outputs the obtained elements of the series data to the likelihood ratio calculation unit 100.

Subsequently, the likelihood ratio calculation unit 100 calculates the likelihood ratio on the basis of the obtained two or more elements. At this time, the likelihood ratio calculation unit 100 calculates a plurality of likelihood ratios in view of the degree of similarity or difference between the series data and the plurality of registration data (step S71). That is, the likelihood ratio calculation unit 100 calculates a plurality of likelihood ratios in accordance with the number of the determination targets (i.e., the number of the registration data).

Subsequently, the determination unit 200 determines whether or not the series data and the registration data are derived from the same target on the basis of the calculated likelihood ratios (step S72). For example, when a first likelihood ratio reaches the genuine threshold, the determination unit 200 determines that the series data and the registration data corresponding to the first likelihood ratio are derived from the same person. Similarly, when a second likelihood ratio reaches the genuine threshold, the determination unit 200 determines that the series data and the registration data corresponding to the second likelihood ratio are derived from the same person.
(Technical Effect)

Next, a technical effect obtained by the information processing apparatus 10 according to the seventh example embodiment will be described.

As described in FIG. 21 and FIG. 22, in the information processing apparatus 10 according to the seventh example embodiment, a plurality of likelihood ratios are calculated in view of the degree of similarity or difference between the series data and each of the plurality of registration data. In this way, even when there are a plurality of registration data (i.e., when there are a plurality of determination targets), it is possible to determine which of the registration data is derived from the same target as that of the series data.

Eighth Example Embodiment

The information processing apparatus 10 according to an eighth example embodiment will be described with reference to FIG. 23 and FIG. 24. The eighth example embodiment is partially different from the seventh example embodiment only in the configuration and operation, and may be the same as the seventh example embodiment in the other parts. For this reason, a part that is different from each of the example embodiments described above will be described in detail below, and a description of other overlapping parts will be omitted as appropriate.

(Functional Configuration)

First, with reference to FIG. 23, a functional configuration of the information processing apparatus 10 according to the eighth example embodiment will be described. FIG. 23 is a block diagram illustrating the functional configuration of the information processing apparatus according to the eighth example embodiment. In FIG. 23, the same components as those illustrated in FIG. 2 carry the same reference numerals.

Figure 23:
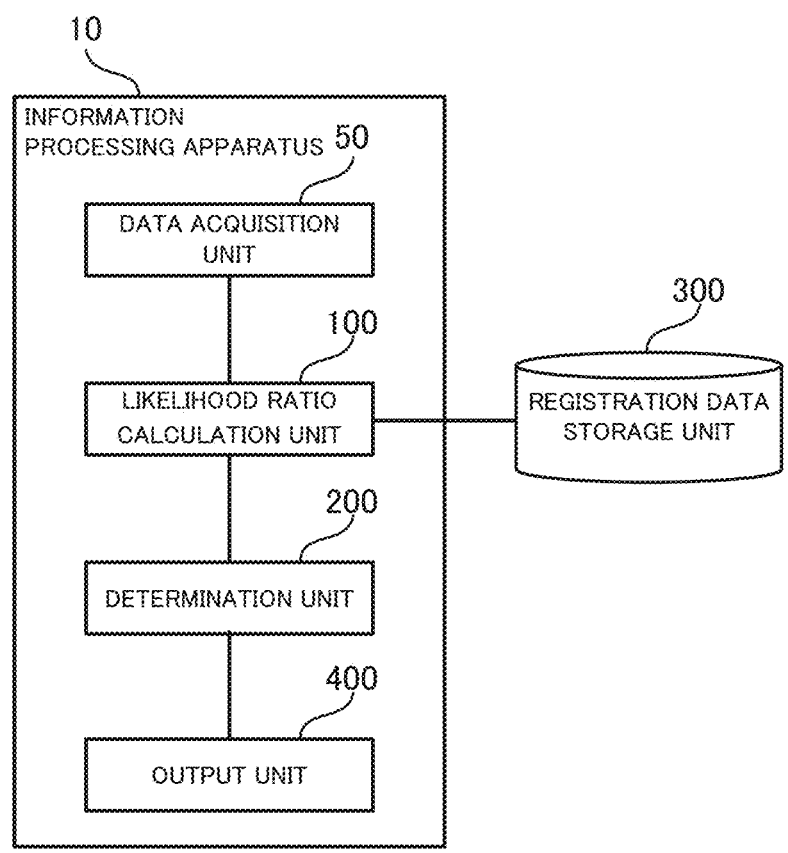
FIG. 23 is a block diagram illustrating a functional configuration of an information processing apparatus according to an eighth example embodiment.

As illustrated in FIG. 23, the information processing apparatus 10 according to the eighth example embodiment includes, as processing blocks for realizing the functions thereof, the data acquisition unit 50, the likelihood ratio calculation unit 100, the determination unit 200, and an output unit 400. That is, the information processing apparatus 10 according to the eighth example embodiment further includes the output unit 400 in addition to the configuration in the first example embodiment (see FIG. 2). The output unit 400 may be realized or implemented by the processor 11 (see FIG. 1), for example. The output unit 400 may include the output apparatus described above (see FIG. 1).

The output unit 400 is configured to output the determination result by the determination unit 200. That is, the output unit 400 is configured to output the determination indicating whether or not the series data and the registration data are derived from the same target. Furthermore, the output unit 400 is especially configured to output, as the determination result, not only one registration datum that is derived from the same target as that of the series data, but also a plurality of registration data that are likely to be derived from the same target as that of the series data. The output unit 400 may output the determination result to a display or the like. The output unit 400 may audio-output the determination result through a speaker or the like.

(Flow of Operation)

Next, with reference to FIG. 24, a flow of operation of the information processing apparatus 10 according to the eighth example embodiment will be described. FIG. 24 is a flowchart illustrating the flow of the operation of the information processing apparatus according to the eighth example embodiment. In FIG. 24, the same steps as those illustrated in FIG. 22 carry the same reference numerals.

Figure 24:
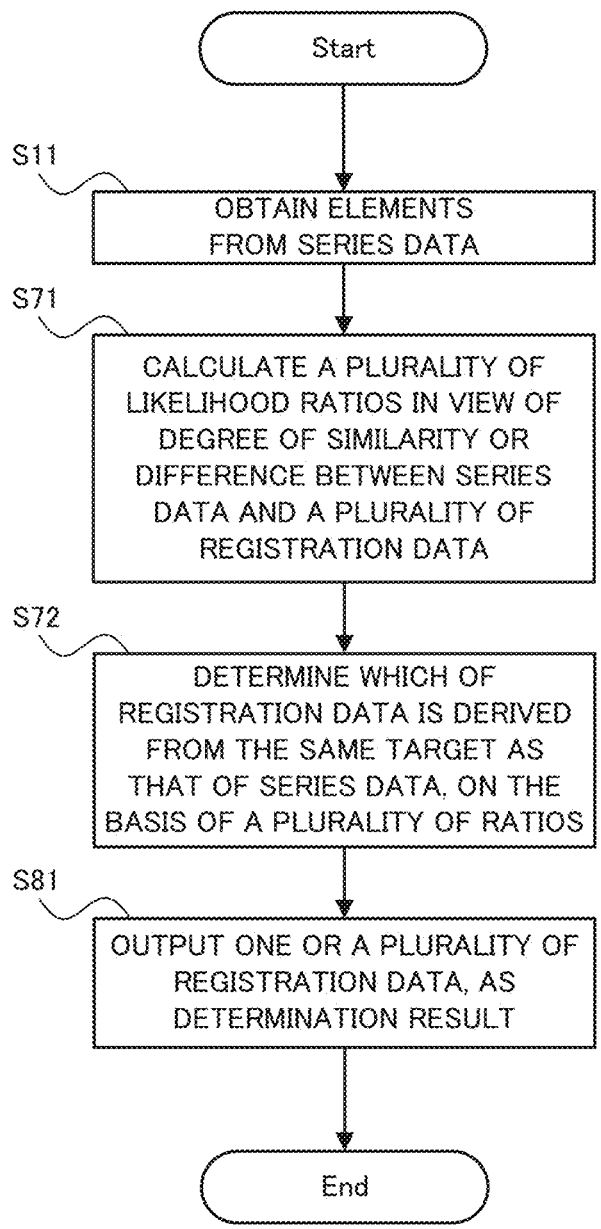
FIG. 24 is a flowchart illustrating a flow of operation of the information processing apparatus according to the eighth example embodiment.

As illustrated in FIG. 24, when the operation of the information processing apparatus 10 according to the eighth example embodiment is started, first, the data acquisition unit 50 obtains elements included in the series data (step S11). The data acquisition unit 50 outputs the obtained elements of the series data to the likelihood ratio calculation unit 100.

Subsequently, the likelihood ratio calculation unit 100 calculates the likelihood ratio on the basis of the obtained two or more elements. At this time, the likelihood ratio calculation unit 100 calculates a plurality of likelihood ratios in view of the degree of similarity or difference between the series data and the plurality of registration data (step S71). That is, the likelihood ratio calculation unit 100 calculates a plurality of likelihood ratios in accordance with the number of the determination targets (i.e., the number of the registration data).

Subsequently, the determination unit 200 determines whether or not the series data and the registration data are derived from the same target on the basis of the calculated likelihood ratios (step S72). Then, the output unit 400 outputs, as the determination result by the determination unit 200, information about one or a plurality of registration data (step S81).

For example, when there is only one likelihood ratio that reaches the genuine threshold among the plurality of likelihood ratios respectively corresponding to the plurality of registration data (i.e., when it is determined that only one registration datum is derived from the same target), the output unit 400 may output only information about one registration datum corresponding to the likelihood ratio, as the determination result. On the other hand, when there are a plurality of likelihood ratios that reach the genuine threshold among the plurality of likelihood ratios respectively corresponding to the plurality of registration data, the output unit 400 may output information about a plurality of registration data corresponding to the plurality of likelihood ratios, as the determination result. Furthermore, when there is no likelihood ratio that reaches the genuine threshold among the plurality of likelihood ratios respectively corresponding to the plurality of registration data, the output unit 400 may select a predetermined number of likelihood ratios in order of a final value of the likelihood ratio closest to the genuine threshold, and may output information about a plurality of registration data corresponding to the selected likelihood ratios, as the determination result. Alternatively, when there is no likelihood ratio that reaches the genuine threshold, the output unit 400 may select a plurality of likelihood ratios in which the final value thereof exceeds a selection threshold that is lower than the genuine threshold, and may output information about a plurality of registration data corresponding to the selected likelihood ratios, as the determination result.

(Technical Effect)

Next, a technical effect obtained by the information processing apparatus 10 according to the eighth example embodiment will be described.

As described in FIG. 23 and FIG. 24, the information processing apparatus 10 according to the seventh example embodiment is configured to output one registration datum that is derived from the same target as that of the series data, or a plurality of registration data that are likely to be derived from the same target as that of the series data. In this way, even when it is hard to accurately narrow down to one registration datum that is derived from the same target as that of the series data, a plurality of candidates can be outputted as the determination result.

Ninth Example Embodiment

The information processing apparatus 10 according to a ninth example embodiment will be described with reference to FIG. 25 and FIG. 26. The ninth example embodiment is partially different from the seventh example embodiment only in the configuration and operation, and may be the same as the seventh example embodiment in the other parts. For this reason, a part that is different from each of the example embodiments described above will be described in detail below, and a description of other overlapping parts will be omitted as appropriate.

(Functional Configuration)

First, with reference to FIG. 25, a functional configuration of the information processing apparatus 10 according to the ninth example embodiment will be described. FIG. 25 is a block diagram illustrating the functional configuration of the information processing apparatus according to the ninth example embodiment. In FIG. 25, the same components as those illustrated in FIG. 2 carry the same reference numerals.

Figure 25:
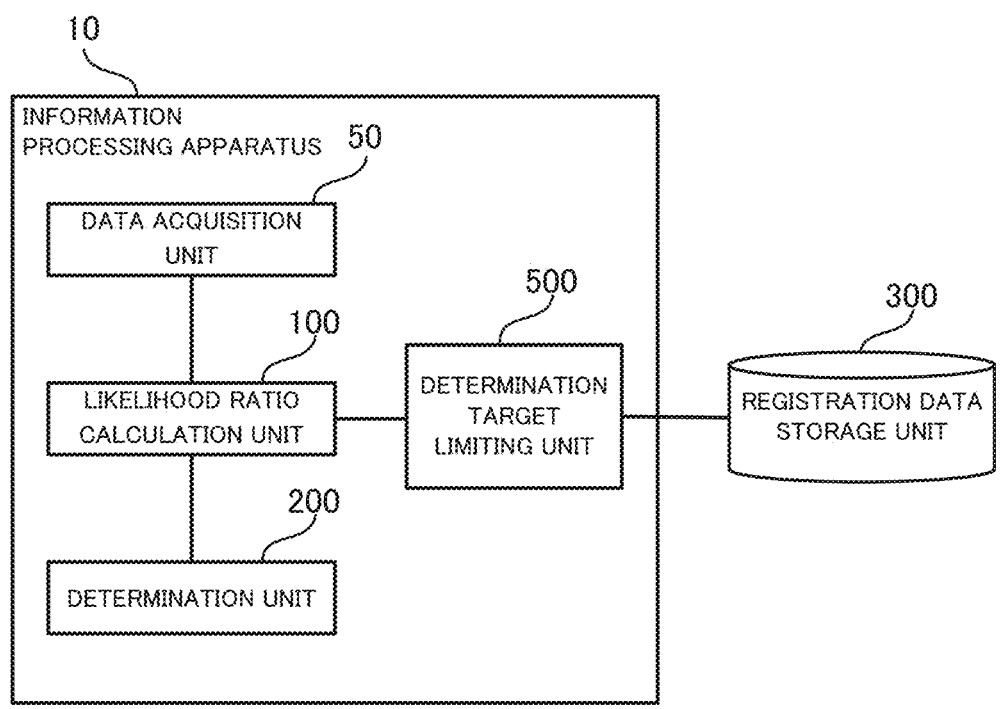
FIG. 25 is a block diagram illustrating a functional configuration of an information processing apparatus according to a ninth example embodiment.

As illustrated in FIG. 25, the information processing apparatus 10 according to the ninth example embodiment includes, as processing blocks for realizing the functions as processing blocks for realizing the functions thereof, the data acquisition unit 50, the likelihood ratio calculation unit 100, the determination unit 200, and a determination target limiting unit 500. That is, the information processing apparatus 10 according to the ninth example embodiment further includes the determination target limiting unit 500 in addition to the configuration in the first example embodiment (see FIG. 2). The determination target limiting unit 500 may be realized or implemented by the processor 11 (see FIG. 1), for example.

The determination target limiting unit 500 is configured to limit the determination target by performing a narrowing process on a plurality of registration data stored in the registration data storage unit 300. That is, the determination target limiting unit 500 is configured to perform a process for reducing the number of the determination targets. For example, when face image data are stored as registered images, the narrowing process performed by the determination target limiting unit 500 may be a face authentication process with a lower processing load. The face authentication process in this case does not have to be so accurate (e.g., it may have a somewhat high rate of allowance for another person). If such a face authentication process is performed, even when it is hard to narrow down to one registration datum that is derived from the same person as that of the series data, it is possible to narrow down the determination target only to the registration data that are likely to be derived from the same person as that of the series data (i.e., a smaller number of registration data than all the stored registration data).

(Flow of Operation)

Next, with reference to FIG. 26, a flow of operation of the information processing apparatus 10 according to the ninth example embodiment will be described. FIG. 26 is a flowchart illustrating the flow of the operation of the information processing apparatus according to the ninth example embodiment. In FIG. 26, the same steps as those illustrated in FIG. 22 carry the same reference numerals.

Figure 26:
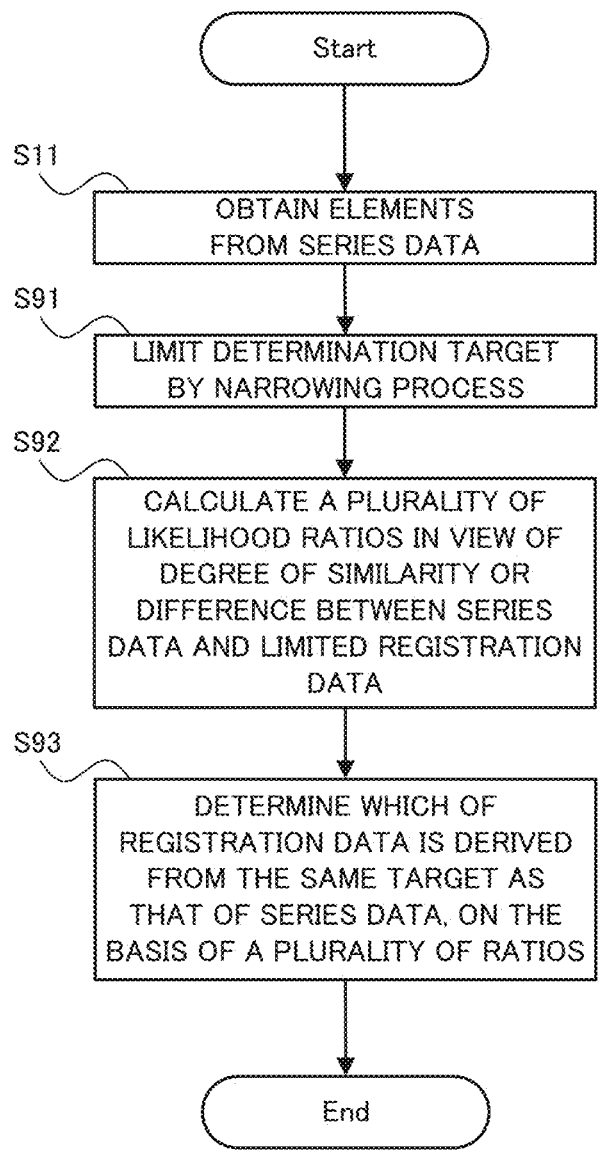
FIG. 26 is a flowchart illustrating a flow of operation of the information processing apparatus according to the ninth example embodiment.

As illustrated in FIG. 26, when the operation of the information processing apparatus 10 according to the ninth example embodiment is started, first, the data acquisition unit 50 obtains elements included in the series data (step S11). The data acquisition unit 50 outputs the obtained elements of the series data to the likelihood ratio calculation unit 100.

Subsequently, the determination target limiting unit 500 performs the narrowing process by using the obtained elements of the series data and limits the numbers of the determination targets (step S91). By this, the subsequent steps are performed only on the limited determination targets. That is, the subsequent steps are performed not on all the registration data stored in the registration data storage unit 300, but on a smaller number of registration data in which the number is reduced by the narrowing process.

The likelihood ratio calculation unit 100 calculates the likelihood ratio on the basis of the obtained two or more elements. At this time, the likelihood ratio calculation unit 100 calculates a plurality of likelihood ratios in view of the degree of similarity or difference between the series data and the limited registration data (step S92). Then, the determination unit 200 determines whether or not the series data and the registration data are derived from the same target on the basis of the calculated plurality of likelihood ratios (step S93).

(Technical Effect)

Next, a technical effect obtained by the information processing apparatus 10 according to the ninth example embodiment will be described.

As described in FIG. 25 and FIG. 26, in the information processing apparatus 10 according to the ninth example embodiment, the registration data that are the determination targets are limited by the narrowing process (i.e., the number of the determination targets is reduced). In this way, even when there are an enormous number of original determination targets, it is possible to reduce the number of the determination target in which the likelihood ratio is actually calculated. Therefore, it is possible to effectively reduce a time required for the process and a processing load of the information processing apparatus 10.

A processing method in which a program for allowing the configuration in each of the example embodiments to operate to realize the functions of each example embodiment is recorded on a recording medium, and in which the program recorded on the recording medium is read as a code and executed on a computer, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and executes processing alone, but also the program that operates on an OS and executes processing in cooperation with the functions of expansion boards and another software, is also included in the scope of each of the example embodiments.

This disclosure is not limited to the examples described above and is allowed to be changed, if desired, without departing from the essence or spirit of this disclosure which can be read from the claims and the entire specification. An information processing apparatus, an information processing method, and a computer program with such changes are also intended to be within the technical scope of this disclosure.

<Supplementary Notes>

The example embodiments described above may be further described as, but not limited to, the following Supplementary Notes below.

(Supplementary Note 1)

An information processing apparatus described in Supplementary Note 1 is an information processing apparatus including: an acquisition unit that obtains a plurality of elements included in series data; a calculation unit that calculates a likelihood ratio indicating a likelihood that the series data are derived from the same target as that of predetermined data, on the basis of at least two consecutive elements of the plurality of elements; and a determination unit that determines whether or not the series data are derived from the same target as that of the predetermined data, on the basis of the likelihood ratio, wherein the calculation unit calculates the likelihood ratio in view of a degree of similarity or difference between the series data and the predetermined data.

(Supplementary Note 2)

An information processing apparatus described in Supplementary Note 2 is the information processing apparatus described in Supplementary Note 1, wherein the calculation unit performs a first process on a combined feature quantity that is obtained by combining a first feature quantity extracted from the series data and a second feature quantity extracted from the predetermined data, and calculates the likelihood ratio on the basis of a processing result of the first process, thereby to take into account the degree of similarity or difference between the series data and the predetermined data.

(Supplementary Note 3)

An information processing apparatus described in Supplementary Note 3 is the information processing apparatus described in Supplementary Note 1, wherein the calculation unit performs a second process on a first feature quantity extracted from the series data, and calculates the likelihood ratio on the basis of a result of comparison between the first feature quantity after the second process and a second feature quantity extracted from the predetermined data, thereby to calculate the degree of similarity or difference between the series data and the predetermined data.

(Supplementary Note 4)

An information processing apparatus described in Supplementary Note 4 is the information processing apparatus described in Supplementary Note 1, wherein the calculation unit performs a third process on a difference feature quantity that is a difference between a first feature quantity extracted from the series data and a second feature quantity extracted from the predetermined data, and calculates the likelihood ratio on the basis of a processing result of the third process, thereby to calculate the degree of similarity or difference between the series data and the predetermined data.

(Supplementary Note 5)

An information processing apparatus described in Supplementary Note 5 is the information processing apparatus described in any one of Supplementary Notes 1 to 4, wherein the calculation unit calculates a plurality of likelihood ratios respectively corresponding to a plurality of predetermined data, and the determination unit determines whether or not the series data are derived from the same target as that of any of the plurality of predetermined data, on the basis of the plurality of likelihood ratios.

(Supplementary Note 6)

An information processing apparatus described in Supplementary Note 6 is the information processing apparatus described in Supplementary Note 5, wherein the determination unit outputs, as a determination result, one predetermined datum that is determined to be derived from the same target as that of the series data, or two or more predetermined data that are determined to be likely derived from be the same target as that the series data.

(Supplementary Note 7)

An information processing apparatus described in Supplementary Note 7 is the information processing apparatus described in Supplementary Note 5 to 6, further including a limiting unit that performs a narrowing process on a plurality of predetermined data to limit a number of the predetermined data that are determination targets of the determination unit.

(Supplementary Note 8)

An information processing apparatus described in Supplementary Note 8 is the information processing apparatus described in any one of Supplementary Notes 1 to 7, wherein the series data include at least one of image data and audio data about a target, and the calculation unit calculates a likelihood ratio indicating a likelihood that the series data are derived from the same target as that of predetermined data.

(Supplementary Note 9)

An information processing method described in Supplementary Note 9 is an information processing method including: obtaining a plurality of elements included in series data; calculating a likelihood ratio indicating a likelihood that the series data are derived from the same target as that of predetermined data, on the basis of at least two consecutive elements of the plurality of elements; determining whether or not the series data are derived from the same target as that of the predetermined data, on the basis of the likelihood ratio; and when calculating the likelihood ratio, taking into account a degree of similarity or difference between the series data and the predetermined data.

(Supplementary Note 10)

A computer program described in Supplementary Note 10 is a computer program that operates a computer: to obtain a plurality of elements included in series data; to calculate a likelihood ratio indicating a likelihood that the series data are derived from the same target as that of predetermined data, on the basis of at least two consecutive elements of the plurality of elements; to determine whether or not the series data are derived from the same target as that of the predetermined data, on the basis of the likelihood ratio; and when calculating the likelihood ratio, to take into account a degree of similarity or difference between the series data and the predetermined data.

(Supplementary Note 11)

A recording medium described in Supplementary Note 11 is a recording medium on which the computer program described in Supplementary Note 10 is recorded.

DESCRIPTION OF REFERENCE CODES

10 Information processing apparatus
11 Processor
14 Storage apparatus
50 Data acquisition unit
100 Likelihood ratio calculation unit
110 Combination unit
120 Comparison unit
130 Difference calculation unit
140 Selection unit
150 Operation detection unit
200 Determination unit
300 Registration data storage unit
400 Output unit
500 Determination target limiting unit

What is claimed is:

1. An information processing apparatus comprising:
at least one memory storing instructions; and
at least one processor that is configured to execute the instructions to:
directly obtain time series data of biometric information of a person from a camera or a microphone, the time series data including a plurality of elements, the biometric information being images of a face of the person in a case where the time series data is obtained from the camera, the biometric information being speech of the person in a case in a case where the time series data is obtained from the microphone;
perform a third process of extracting a feature vector from a difference feature vector calculated sequentially as a difference between a first vector extracted from the time series data of a target, wherein the time series data of the target includes at least two consecutive elements in time series, and a second vector extracted from registration data of biometric information of a registered person, to calculate a degree of similarity or difference between the time series data and the registration data;

calculate a likelihood ratio indicating a likelihood that the person of the time series data is a same person as the registered person of the registration data, in consideration of the degree of similarity or difference between the time series data and the registration data, on the basis of the feature vector extracted from the difference feature vector; and determine whether or not the person of the time series data is the registered person of the registration data, on the basis of the likelihood ratio, to perform biometric authentication of the person, where the biometric authentication is successful when the person has been determined to be the registered person and is unsuccessful when the person has not been determined to be the registered person; and upon determining that the person of the time series data is the registered person of the registration data, perform a registration process conditioned on the biometric authentication.

2. The information processing apparatus according to claim 1, wherein the at least one processor is configured to execute the instructions to calculate a plurality of likelihood ratios respectively corresponding to a plurality of the registration data of a plurality of the registered persons, and the at least one processor is configured to execute the instructions to determine whether or not the person of the time series data is the registered person of any of the plurality of registration data, on the basis of the plurality of likelihood ratios.

3. The information processing apparatus according to claim 2, wherein the at least one processor is configured to execute the instructions to output, as a determination result, the registration data of for every registered person of the plurality of registered persons that the person of the time series data has been determined to be.

4. The information processing apparatus according to claim 2, wherein the at least one processor is configured to execute the instructions to perform a narrowing process on the plurality of registration data to limit a number of the plurality of registered persons that the person of the time series data has been determined to be.

5. An information processing method performed by a computer and comprising:

directly obtaining time series data of biometric information of a person from a camera or a microphone, the time series data including a plurality of elements, the biometric information being images of a face of the person in a case where the time series data is obtained from the camera, the biometric information being speech of the person in a case in a case where the time series data is obtained from the microphone;

performing a third process of extracting a feature vector from a difference feature vector calculated sequentially as a difference between a first vector extracted from the time series data of a target, wherein the time series data of the target includes at least two consecutive elements in time series, and a second vector extracted from registration data of biometric information of a registered person, to calculate a degree of similarity or difference between the time series data and the registration data;

calculating a likelihood ratio indicating a likelihood that the person of the time series data is a same person as the registered person of the registration data, in consideration of the degree of similarity or difference between the time series data and the registration data, on the basis of the feature vector extracted from the difference feature vector; and determining whether or not the person of the time series data is the registered person of the registration data, on the basis of the likelihood ratio, to perform biometric authentication of the person, where the biometric authentication is successful when the person has been determined to be the registered person and is unsuccessful when the person has not been determined to be the registered person; and upon determining that the person of the time series data is the registered person of the registration data, performing a registration process conditioned on the biometric authentication.

6. A non-transitory recording medium storing a computer program executable by a computer to perform an information processing method comprising:

directly obtaining time series data of biometric information of a person from a camera or a microphone, the time series data including a plurality of elements, the biometric information being images of a face of the person in a case where the time series data is obtained from the camera, the biometric information being speech of the person in a case in a case where the time series data is obtained from the microphone;

performing a third process of extracting a feature vector from a difference feature vector calculated sequentially as a difference between a first vector extracted from the time series data of a target, wherein the time series data of the target includes at least two consecutive elements in time series, and a second vector extracted from registration data of biometric information of a registered person, to calculate a degree of similarity or difference between the time series data and the registration data;

calculating a likelihood ratio indicating a likelihood that the person of the time series data is a same person as the registered person of the registration data, in consideration of the degree of similarity or difference between the time series data and the registration data, on the basis of the feature vector extracted from the difference feature vector; and determining whether or not the person of the time series data is the registered person of the registration data, on the basis of the likelihood ratio, to perform biometric authentication of the person, where the biometric authentication is successful when the person has been determined to be the registered person and is unsuccessful when the person has not been determined to be the registered person; and upon determining that the person of the time series data is the registered person of the registration data, performing a registration process conditioned on the biometric authentication.

7. The information processing apparatus according to claim 1, wherein the at least one processor is configured to convert the feature vector to binary indicating that the person of the time series data is the registered person of the registration data and that the person of the time series data is not the registered person of the registration data.

8. The information processing apparatus according to claim 7, wherein the at least one processor is configured to calculate the likelihood ratio by using the feature vector as has been converted to binary.

9. The information processing apparatus according to claim 1, wherein the at least one processor is configured to execute the instructions to extract the feature vector by inputting the difference feature vector into a Long Short Term Memory.

10. The information processing apparatus according to claim 9, wherein the at least one processor is configured to calculate the likelihood ratio from the feature vector.

* * * * *